United States Patent [19]
Kidokoro et al.

[11] Patent Number: 6,142,908
[45] Date of Patent: Nov. 7, 2000

[54] SPEED RATIO CONTROLLER AND CONTROL METHOD OF CONTINUOUSLY VARIABLE TRANSMISSION

[75] Inventors: Hitoshi Kidokoro; Itsuro Muramoto; Yasushi Narita; Kazuhiro Takeda, all of Yokohama, Japan

[73] Assignee: Nissan Motor Co., Ltd., Yokohama, Japan

[21] Appl. No.: 09/345,792

[22] Filed: Jul. 1, 1999

[30] Foreign Application Priority Data

Jul. 1, 1998 [JP] Japan ................... 10-186066
Jul. 23, 1998 [JP] Japan ................... 10-207901

[51] Int. Cl.[7] .................................................. B60K 41/16
[52] U.S. Cl. ................... 477/38; 701/54; 701/61
[58] Field of Search .................. 477/37, 38, 68; 701/60, 61, 54

[56] References Cited

U.S. PATENT DOCUMENTS 4,509,125  4/1985  Fattic et al. ............................. 701/61
4,729,103  3/1988  Oshiage et al. ......................... 701/61
5,669,845  9/1997  Muramoto et al. .................... 475/186
5,674,145  10/1997 Kidokoro et al. ..................... 475/192
5,707,313  1/1998  Suzuki ..................................... 477/43

FOREIGN PATENT DOCUMENTS 8-270772  10/1996  Japan.
9-53716   2/1997   Japan.

Primary Examiner—Charles A Marmor
Assistant Examiner—Ha Ho
Attorney, Agent, or Firm—Foley & Lardner

[57] ABSTRACT

A gyration angle $\phi$ of a power roller (3) of a toroidal continuously variable transmission (10) is made to vary via a step motor (4) and control valve (5). A controller (61) calculates a feedback control amount v of a step motor (4) so that a real speed ratio i of the transmission (10) coincides with a target speed ratio i*. The controller (61) calculates a command value u by correcting a control value v based on a non-linear relation between the gyration angle $\phi$ and the real speed ratio i, and controls the actuator (4) based on the command value u.

15 Claims, 15 Drawing Sheets

SPEED RATIO CONTROLLER AND CONTROL METHOD OF CONTINUOUSLY VARIABLE TRANSMISSION

FIELD OF THE INVENTION

This invention relates to speed ratio control of a continuously variable transmission.

BACKGROUND OF THE INVENTION

Various rotation speeds used for a speed ratio control of a continuously variable transmission such as a vehicle speed, and input/output rotation speeds of the transmission are detected by counting pulse signals which a hall element emits corresponding to the passage of a gear formed on a rotation axis.

However, when the vehicle speed is very low such as when the vehicle is starting, the speeds detected by such a method are not sufficiently accurate for use in the control of speed ratio.

Tokkai Hei 9-53716 published by the Japanese Patent Office published in this regard in 1997 discloses a speed ratio control of a toroidal continuously variable transmission wherein feedback control and feed forward control (open loop control) are combined.

In other words feed forward control is applied to speed ratio control when the detection accuracy of various rotation speeds is low, and feedback control is applied after the detection accuracy reaches a predetermined accuracy level.

The above prior art also discloses to learn a control value in feedback control and modify a target speed change ratio of feed forward control using a learned control value in order to prevent a speed change shock from occurring when the control method is changed over.

SUMMARY OF THE INVENTION

In this prior art, speed ratio control is performed assuming that a speed ratio and a gyration angle of power rollers which are a speed change medium are in a linear relation, however an error arises as this relation is actually non-linear. Such a n on-linear relation between speed ratio and speed change medium also applies to a V-belt continuously variable transmission.

Even with the learning of the control value in feed back control, errors will remain until sufficient learning has been performed, which may cause an abrupt change of speed ratio during change-over of control method.

In transmission control u sing oil pressure devices, feedback control conditions of the speed ratio depend not only on the accuracy of detecting various rotation speeds but also on oil temperature.

This is because when oil temperature is low, the response of a control mechanism using oil is also low and sometimes it is not suitable to perform feedback control.

However, if these parameters are included in change over conditions from feed forward control to feed back control, the speed ratio range in which change over takes place becomes large, so the learning range also becomes large and the control load increases.

It is therefore an object of this invention to correct errors due to non-linearity between a speed ratio and the displacement of a speed change medium in speed change ratio control of a continuously variable transmission.

It is a further object of this invention to effectively suppress speed change shock in a change-over from feed forward control to feedback or vice versa, of the speed ratio.

In order to achieve the above objects, this invention provides a speed ratio controller of such a continuously variable transmission for a vehicle that continuously changes a speed ratio according to a displacement of a speed change medium in response to an actuator. The controller comprises sensors for detecting a real speed ratio and a microprocessor programmed to calculate a target speed ratio $i^*$ of the transmission, calculate a control amount v of the actuator so that the real speed ratio i coincides with the target speed ratio $i^*$, calculate a command value u by correcting the control amount v based on a non-linear relation between the displacement and the real speed ratio, and control the actuator based on the command value u.

This invention also provides a speed ratio control method of such a continuously variable transmission for a vehicle that continuously changes a speed ratio by displacement of a speed change medium in response to an actuator. The method comprises detecting a real speed ratio, calculating a target speed ratio $i^*$ of the transmission, calculating a control amount v of the actuator so that the real speed ratio i coincides with the target speed ratio $i^*$, calculating a command value u by correcting the control amount v based on a non-linear relation between the displacement and the real speed ratio, and controlling the actuator 4 based on the command value u.

The details as well as other features and advantages of this invention ar e set forth in the remainder of the specification and are shown in the accompanying drawings.

DESCRIPTION OF THE PREFERRED EMBODIMENTS

Figure 1:
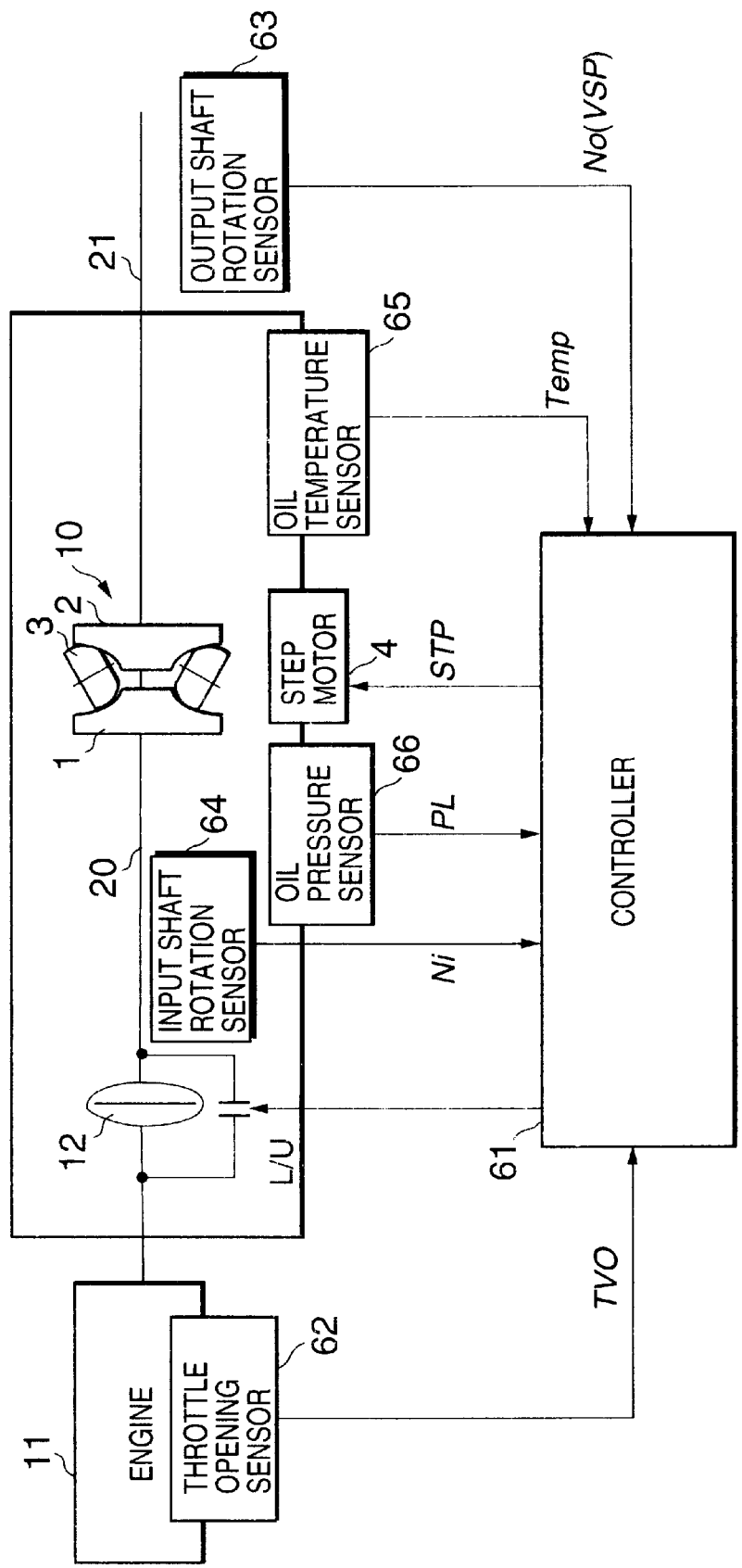
FIG. 1 is a schematic diagram of a speed change ratio controller according to this invention.

Referring to FIG. 1 of the drawings, a toroidal continuously variable transmission (toroidal CVT) 10 for a vehicle comprises an input shaft 20 and output shaft 21.

The input shaft 20 is connected to an engine 11 via a torque converter 12 comprising a lock up mechanism L/U. The output shaft 21 is connected to a drive wheel, not shown.

The continuously variable transmission 10 comprises an input disk 1 and output disk 2 arranged on the same axis, and a pair of power rollers 3 which are gripped between the disks 1, 2 and transmit torque between the disks by friction.

Figure 15:
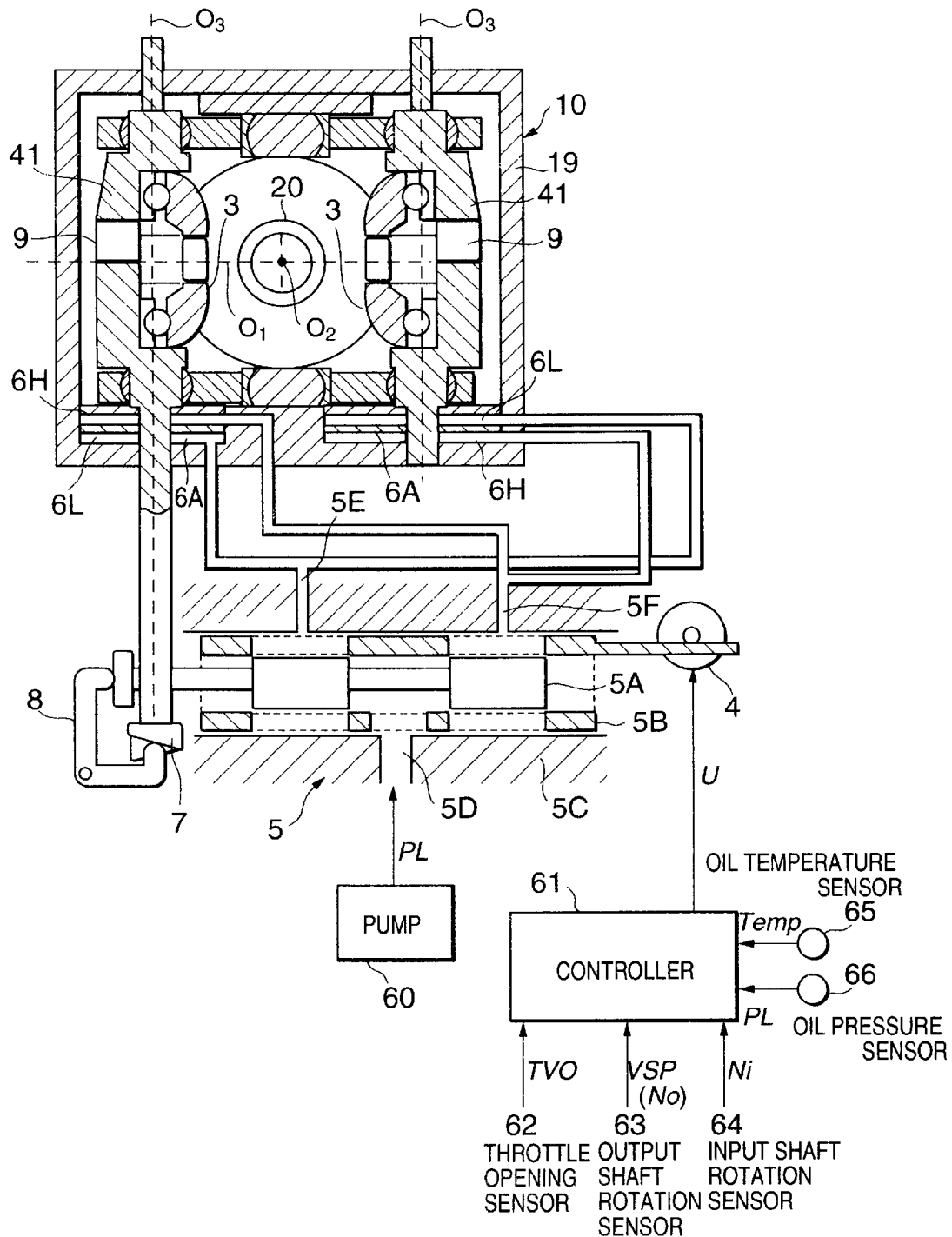
FIG. 15 is a cross-sectional view of the toroidal continuously variable transmission.

Each of the power rollers 3 is supported free to rotate on an offset axis 9 attached to a trunnion 41 as shown by FIG. 15. The offset axis 9 is supported free to pivot relative to the trunnion 41, and the trunnion 41 is supported free to rotate about a trunnion axis $O_3$ as center.

The piston 6A is fixed to the base end of the trunnion 41.

The piston 6A drives the trunnion 41 along the trunnion axis $O_3$ in response to the oil pressure of upper and lower oil chambers 6H, 6L Oil pressure is supplied to the oil chambers 6H and 6L from an oil pressure unit 60 via a control valve 5

The control valve 5 comprises a sleeve 5B driven by a step motor 4 in response to a command signal from a transmission controller 61 and a spool 5A which engages with the inside of a sleeve 41.

The displacement of the trunnion 41 in the direction of the trunnion axis $O_3$ and its rotational displacement about the trunnion axis $O_3$ as center is fed back to the displacement of the sleeve 5B via a mechanical feedback mechanism which comprises a precess cam 7 and link 8.

The step motor 4 rotates according to a speed ratio command value step number output by the controller 61, and causes a relative displacement of the sleeve 5B and spool 5A via a rack and pinion.

The control valve 5 comprises an input port 5D connected to the oil pressure unit 60, and ports 5E and 5F. The port 5E is connected to the oil chamber 6L of the trunnion 41 on the left of FIG. 12 and the oil chamber 6H of the trunnion 41 on the right of FIG. 12. The port 5F is connected to the oil chamber 6H of the trunnion 41 on the left of the figure and the oil chamber 6L of the trunnion 41 on the right of the figure. These ports 5E and 5F are selectively connected with the port 5D according to the relative displacement of the sleeve 5B and spool 5A.

As a result, the pair of trunnions 41 is always driven in opposite directions. Due to the displacement in opposite directions of these trunnions, the power rollers 3 are offset in opposite directions along the axis $O_3$ from a neutral position shown in FIG. 11 at which the rotation axis $O_1$ intersects with the rotation axis $O_2$ of the disks 1 and 2.

Due to this offset in the $O_3$ axis direction, the power rollers 3 receive component forces from the input and output disks 1 and 2, and the trunnions 41 are rotated about the rotation axis $O_3$. As a result, the contact radius of the power roller 3 and the input disk 1 reaches a value different from the contact radius of the power roller 3 and input disk 2. Due to the inclination of this power roller 3, any desired speed ratio can be obtained.

Figure 14:
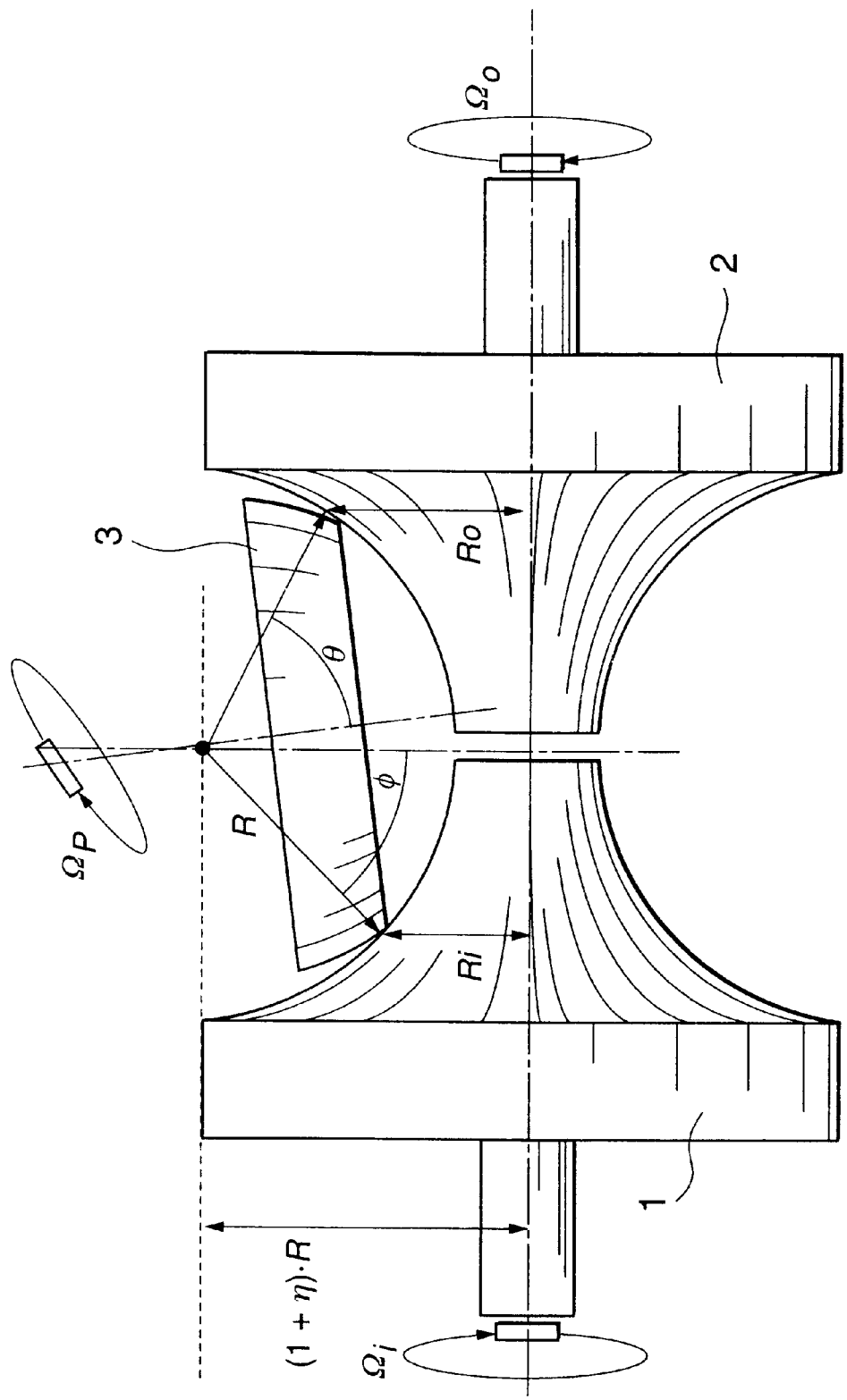
FIG. 14 is a schematic diagram of a toroidal continuously variable transmission to which this invention is applied.

Here, a relation between an offset amount y in the $O_3$ axis direction and a gyration angle ¢ of the power roller 3 is approximately given by the following expression (1)

$$\frac{d\phi}{dt} = f \cdot y \qquad (1)$$

$$f = \frac{\cos(\theta - \phi) \cdot \{1 + \eta - \cos(2 \cdot \theta - \phi)\} \cdot No}{(1 + \eta) \cdot R \cdot \sin\theta}$$

where, $\theta, \eta, R$ = constants determined according to the dimensions of the transmission as shown in FIG. 14, and No=rotation speed of output disk 2.

The offset amount y and the gyration angle $\phi$ in the $O_3$ axis direction of the power roller 3 when the speed ratio command value output by the transmission controller 61 is achieved, is fed back from the trunnion 41 to the spool 5A of the control valve 5 via the precess cam 7 and link 8. Therefore, the spool 5A returns to the neutral position relative to the sleeve 5B, and the ports 5E and 5F are cut off from the port 5D as shown in FIG. 15.

As a result, the trunnion 41 returns to the neutral position at which the axes $O_1$, $O_2$ intersect while the power roller 3 is maintained at the gyration angle corresponding to the above-mentioned speed ratio command value.

The above-mentioned speed change mechanism and mechanical feedback mechanism are known from U.S. Pat. No. 5,674,145 and the aforesaid prior art Tokkai Hei 9-53716.

The above-mentioned speed change action of the toroidal continuously variable transmission 10 is performed according to a command signal output to the step motor 4 from the controller 61.

The controller 61 comprises a microcomputer comprising a central processing unit (CPU), read-only memory (ROM), random access memory (RAM) p and an input/output (I/O) interface.

For the purpose of the speed ratio control, signals are input to the controller 61 from a throttle opening sensor 62 which detects a throttle opening TVO of the engine 11, an output shaft rotation sensor 63 which detects a rotation speed No of the output shaft 21 and the vehicle speed VSP, an input shaft rotation sensor 64 which detects a rotation speed Ni of the input shaft 20, an oil temperature sensor 65 which detects an oil temperature Temp of the continuously variable transmission 10, and an oil pressure sensor 66 which detects a line pressure PL which is supplied to a control valve S.

The vehicle speed VSP is calculated by multiplying the rotation speed No of the output shaft 21 by a predetermined constant.

Based on the vehicle speed VSP and the throttle opening TVO, the controller 61 computes a target speed ratio. Here, speed ratio means a value obtained by dividing the input shaft rotation speed Ni by the output shaft rotation speed No.

The controller 61 also performs feedback control of the speed ratio by proportional integral differential control (PID control) depending on the vehicle running conditions.

For this purpose, feedback gains $c_0$, $c_1$, and $c_2$ are calculated for proportional control, integral control and differential control respectively.

A command value u is then computed under these gains so that the real speed ratio coincides with the target speed ratio of the continuously variable transmission 10, and a corresponding command signal is output to the step motor 4. The command value u corresponds to a step number STP of the step motor 4.

At low vehicle speeds when the detection precision of the output shaft rotation sensor 63 falls, or at low oil temperatures or high oil temperatures when the response speed of the step motor 4 falls, feedback control of the speed ratio is not performed, and the step motor is controlled by feed forward control.

When the vehicle speed VSP and oil temperature Temp satisfy feedback conditions, the speed ratio control method is changed from feed forward to feed back.

Figure 2:
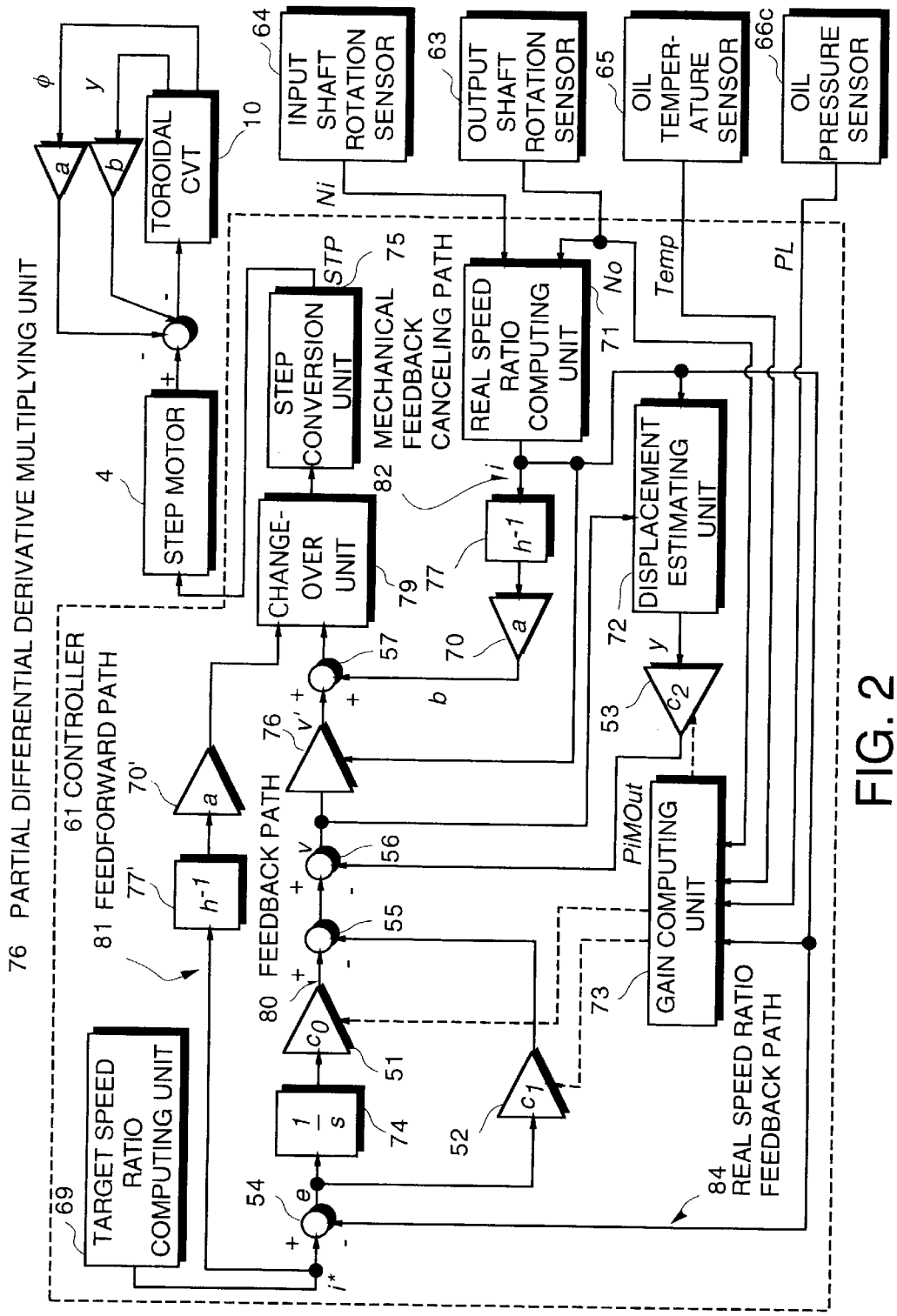
FIG. 2 is a block diagram describing functions of a controller according to this invention.

Next, referring to FIG. 2, the functions with which the controller 61 is provided for performing the above speed ratio control will be described.

It should be noted that the units shown in the diagram exist virtually, but not physically, inside the controller 61 which comprises a microprocessor.

The controller 61 comprises a real speed ratio computing unit 71 which calculates the gyration angles of the power rollers of the continuously variable transmission 10, a feedback path 80 which performs feedback control, a feedforward path 81 which performs feed forward control, a change-over device 79 which selects either of these paths, and a converting unit 75 which converts a signal output from the change-over device 79 to a command signal output to the step motor 4.

It further comprises a target speed ratio computing unit 69 which computes the target speed ratio i* according to the throttle opening TVO and the vehicle speed VSP.

The feedback path 80 comprises an integrator 74, feedback gain multipliers 51–53, adders 55, 57 and a subtractor 54, which add or subtract calculated values, a displacement estimating unit 72 which estimates an offset amount y of the power rollers of the continuously variable transmission 10, a gain computing unit 73 which computes gains of the PID control, a mechanical feedback cancelling path 82 which cancels a mechanical feedback amount of the continuously variable transmission 10, and a partial differential derivative multiplication unit 76 which compensates errors due to nonlinearity between the gyration angles of the power rollers and the speed ratio.

An inverse function computing unit 77 and multiplier 70 of a cam ratio a are provided in the mechanical feedback cancelling path 82.

The feedforward path 81 comprises an inverse function computing unit 77 and multiplier 70 which have an identical construction to those of the inverse function computing unit 77 and multiplier 70 of the mechanical feedback cancelling path 82.

The real speed ratio computing unit 71 computes a real speed ratio i from the ratio of the output shaft rotation speed No and the input shaft rotation speed Ni. The speed ratio i is input to the subtractor 54 via a real speed ratio feedback path 84. The target speed ratio computing unit computes the target speed ratio i* from the throttle opening TVO and the vehicle speed VSP by looking up a map previously stored in the controller 61.

Based on a deviation e between the target speed ratio i* and real speed ratio i, the controller 61 calculates a feedback control amount as described below.

The gain computing unit 73 determines the integral gain $c_0$, proportional gain $c_1$ and differential gain $c_2$ of PID control based on the vehicle speed VSP, real speed ratio i, oil temperature Temp and line pressure PL, by the following equations (2)–(4).

$$c_0 = \frac{\lambda_1 \cdot \lambda_2 \cdot \lambda_3}{g \cdot f} \quad (2)$$

$$c_1 = \frac{(\lambda_1 \cdot \lambda_2 + \lambda_2 \cdot \lambda_3 + \lambda_3 \cdot \lambda_1)}{g \cdot f} \quad (3)$$

$$c_2 = \frac{(\lambda_1 + \lambda_2 + \lambda_3)}{g} - b \quad (4)$$

where $\lambda_1, \lambda_2, \lambda_3$=coefficients representing the pole of a transfer function, b=feedback gain of offset amount y in the $O_3$ axis direction due to precess cam 7 and link 8, and g, $\phi$=coefficients described later.

Figure 3:
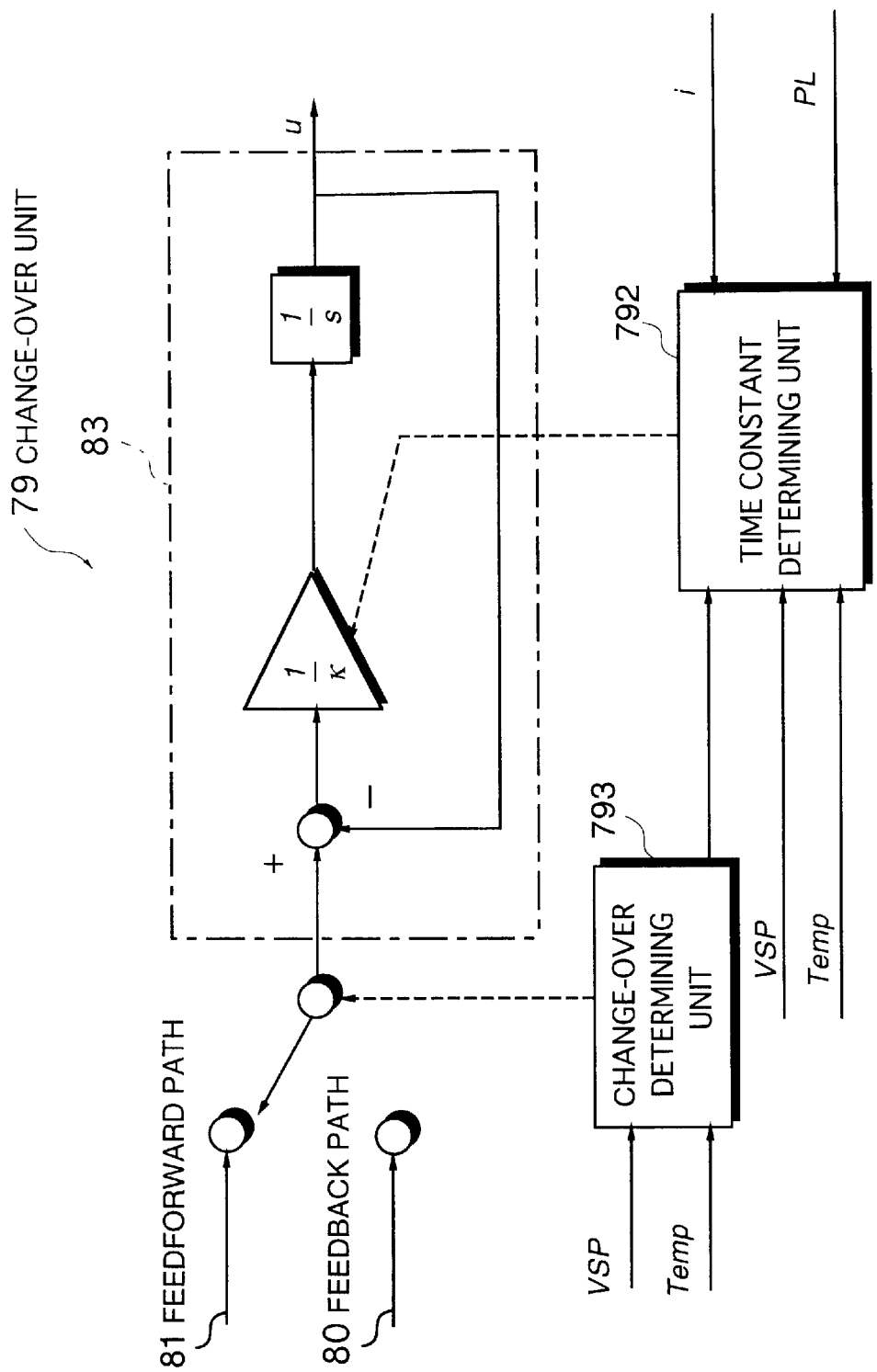
FIG. 3 is a block diagram describing a change-over function between feed forward control and feedback control of the controller.
Figure 11:
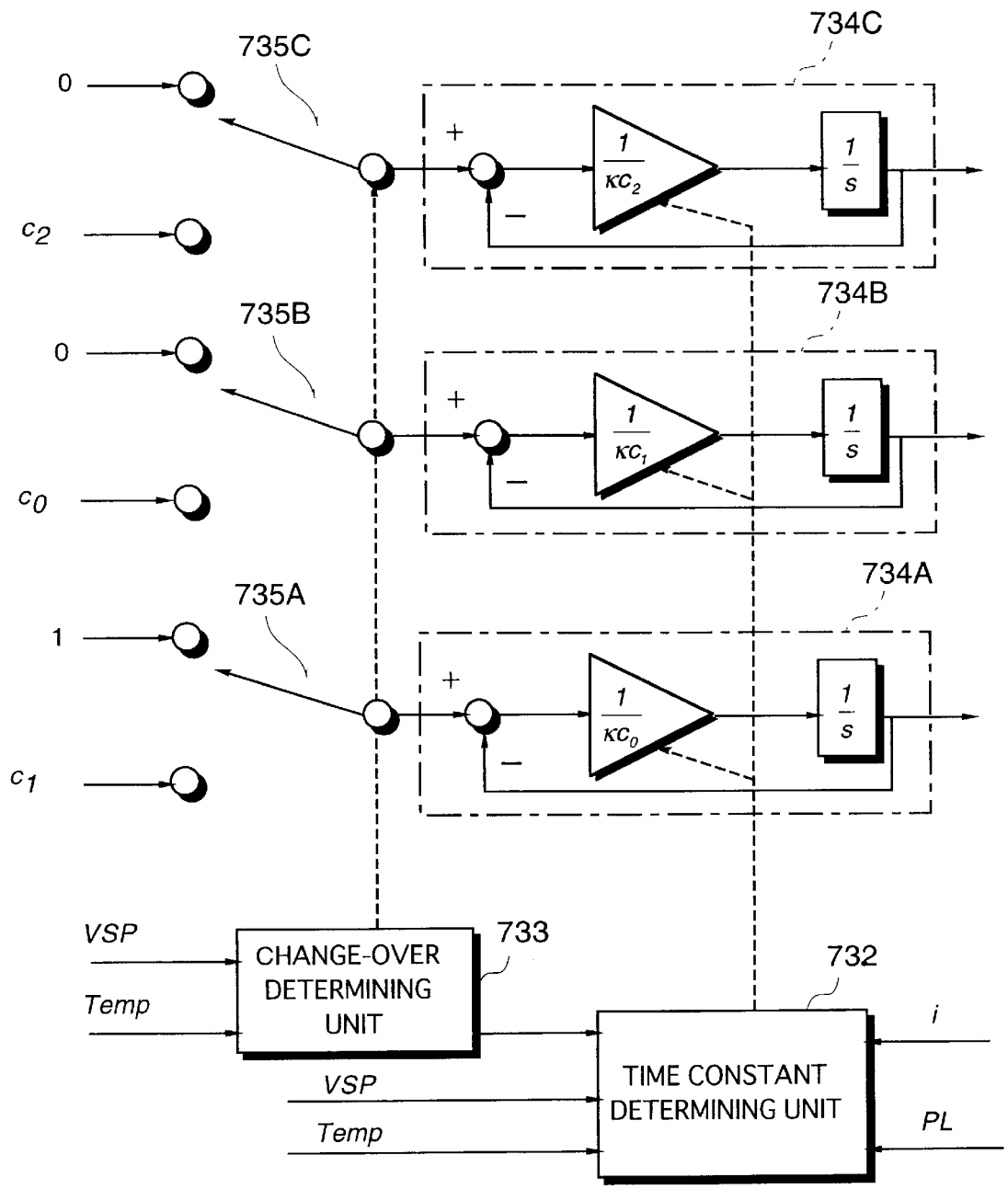
FIG. 11 is a block diagram describing a gain computing function of the controller according to the second embodiment.

The transfer function of the mechanical feedback mechanism of the toroidal continuously variable transmission 10 shown in FIGS. 3 and 11, may be represented by the following equation (5).

$$G_p^{Org}(s) = \frac{g \cdot f}{s^2 + g \cdot b \cdot s + g \cdot f \cdot a} \quad (5)$$

where, a=feedback gain of the gyration angle $\phi$ due to a precess cam 7 and link 8.

The above-mentioned equations 2–4 are obtained by determining the gains $c_0$, $c_1$, and $c_2$ so that this linear system has the characteristics of the following equation (6).

$$W(s) = \frac{(c_1 \cdot s + c_0) \cdot g \cdot f}{(s + \lambda_1) \cdot (s + \lambda_2) \cdot (s + \lambda_3)} \quad (6)$$

The coefficients $\lambda_1, \lambda_2, \lambda_3$ which represent the pole of the aforesaid transfer function must be positive real numbers. If any of the coefficients $\lambda_1, \lambda_2, \lambda_3$ are negative, the system becomes unstable and it becomes impossible to control the speed ratio to the target value. If any of the coefficients $\lambda_1, \lambda_2, \lambda_3$ are imaginary, the result of feedback control oscillates which has an adverse effect on drivability of the vehicle.

The basis of the above equations for determining the feedback gains $c_0$, $c_1$, $c_2$ will now be described.

The controller 61 is provided with the mechanical feedback cancelling path 82 which adds the effect of the precess cam 7 during the process of computing the command value u so as to offset the mechanical feedback amount b of the gyration angle $\phi$ due to the precess cam 7.

By providing the mechanical feedback cancelling path 82, the transfer function of the toroidal continuously variable transmission 10 is equivalent to the following equation (7).

$$G_p(s) = \frac{g \cdot f}{s \cdot (s + g \cdot b)} \quad (7)$$

The transfer function of the process until the target gyration angle is reflected in the real gyration angle may be represented by the following equation (8). This equation is well-known from control theory.

$$W(s) = \frac{(c_1 \cdot s + c_0) \cdot g \cdot f}{s^3 + (g \cdot b + g \cdot c_2) \cdot s^2 + g \cdot f \cdot c_1 \cdot s + g \cdot f \cdot c_0} \quad (8)$$

Since equation 8 coincides with equation 6, the gains $c_0$, $c_1$, $c_2$ may be represented by the equations (2)–(4). The coefficient g is a process gain until a variation of an opening amount x of the control valve 5, i.e., a variation of the magnitude of a gap between a sleeve 5B and spool 5A, reaches the variation of the offset amount y of the power rollers 3. The coefficient g is looked up from a g_Table shown in FIG. 9 based on the oil temperature Temp and line pressure PL.

Figure 9:
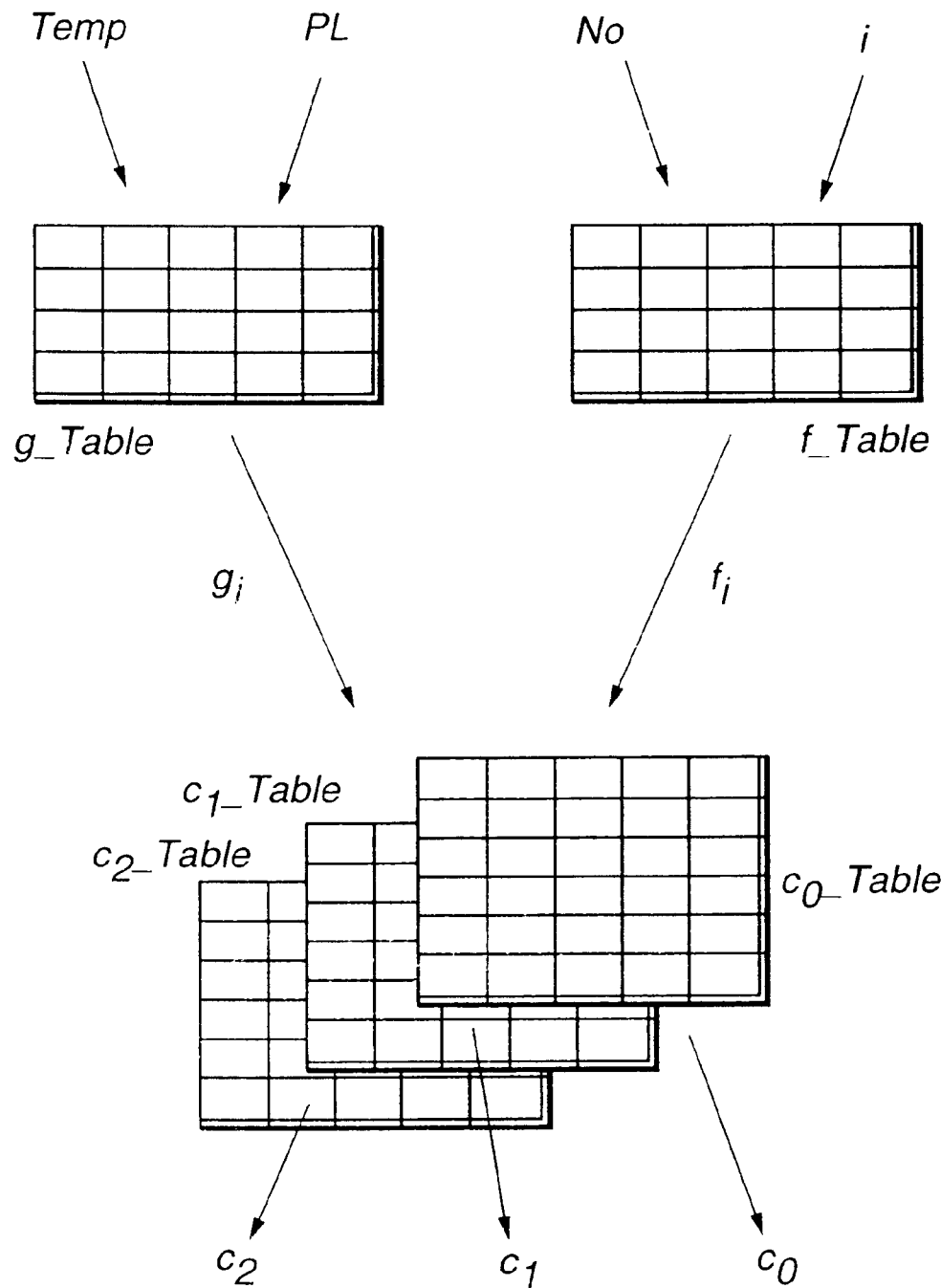
FIG. 9 is a diagram describing the configuration of tables used by the controller to determine feedback gains $c_0, c_1, c_2$.
Figure 10:
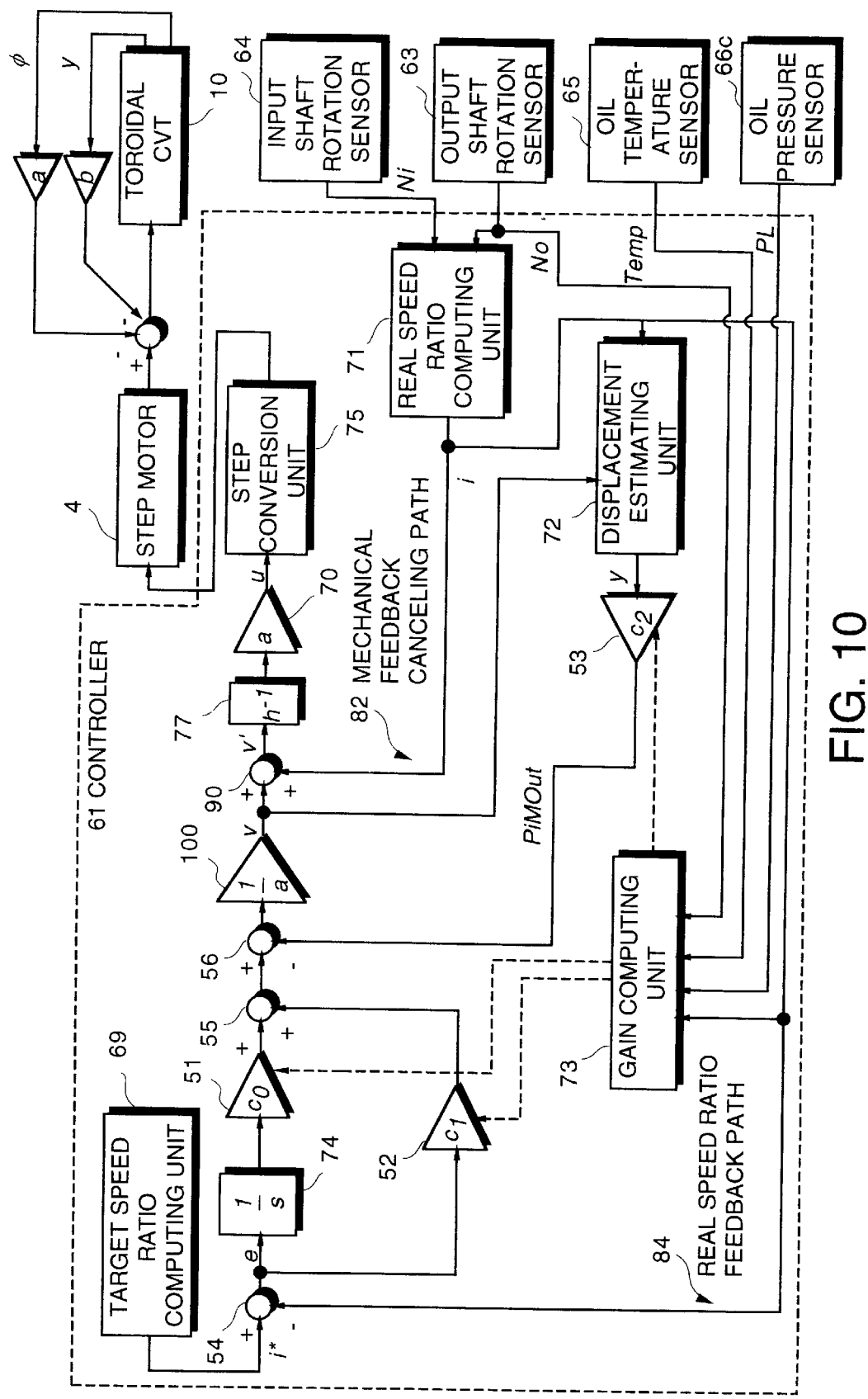
FIG. 10 is a block diagram describing functions of a controller according to a second embodiment of this invention.

The coefficient $\phi$ is determined from the structure of the toroidal continuously variable transmission 10, and is looked up from a f_Table shown in FIG. 9 based on the constants $\theta, \eta, R$ used in equation 1, the real speed ratio and the output disc rotation speed No.

By looking up $c_0$_Table, $c_1$_Table, $c_2$_Table shown in FIG. 9 using these coefficients g and $\phi$ respectively, the feedback gains $c_0, c_1, c_2$ are determined.

The gain calculating unit 73 undertakes the calculation of the above-mentioned feedback gains.

The calculated feedback gains $c_0, c_1, c_2$ are used as follows. The adder 55 adds a value obtained by multiplying the output of the integrator 74 by the integral gain $c_0$ to a value obtained by multiplying the deviation e by the proportional gain $c_1$. On the other hand, an output PiMOut obtained by multiplying the output of the y displacement estimating unit 72 by the differential gain $c_2$ is deducted from the output of the adder 55 in the subtractor 56 so as to obtain a control amount v.

The y displacement estimating unit 72 estimates the offset amount y of the power rollers 3 based on the real speed ratio i and the control amount v. Herein the control amount v is the value output from the subtractor 56 in the previous control cycle. The offset amount y may be found from the differential value of the gyration angle $\phi$ of the power rollers 3. The function of the y displacement estimating unit 72 is known from Tokkai Hei 08-270772 published by the Japanese Patent Office in 1996.

Figure 7:
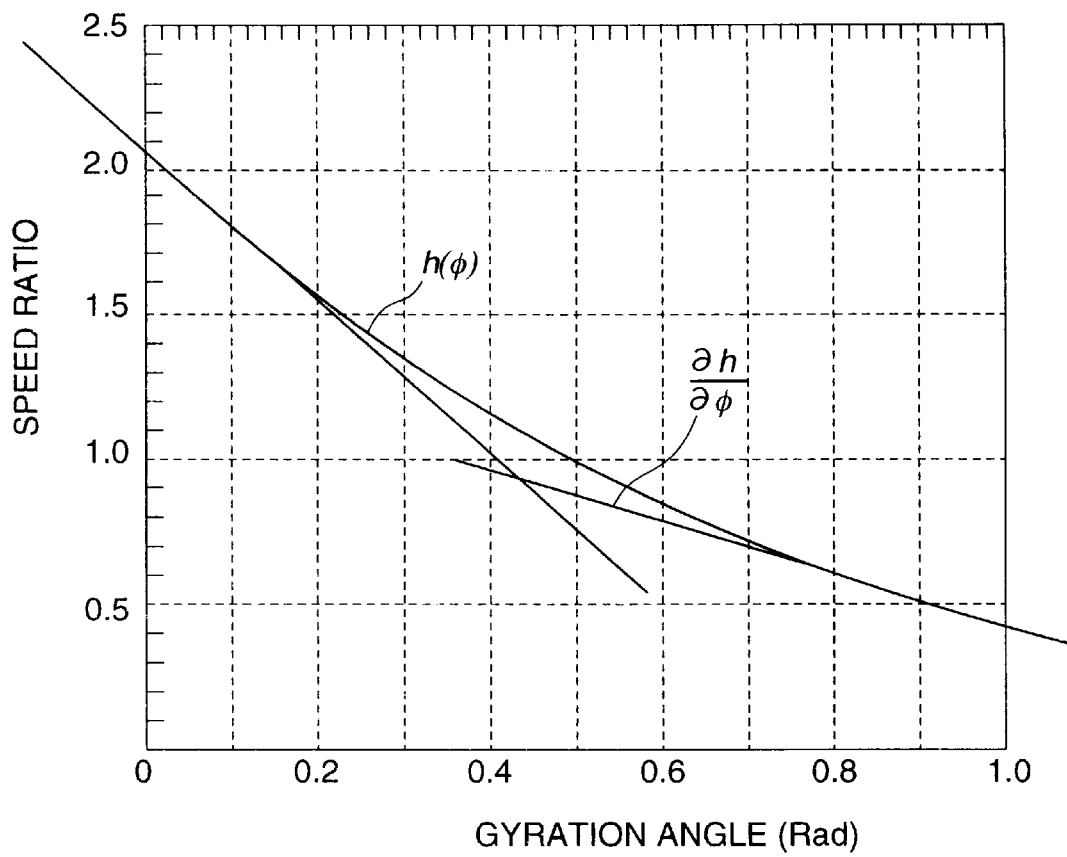
FIG. 7 is a diagram showing the relation between a power roller gyration angle $\phi$ and speed ratio i in a toroidal continuously variable transmission.
Figure 8:
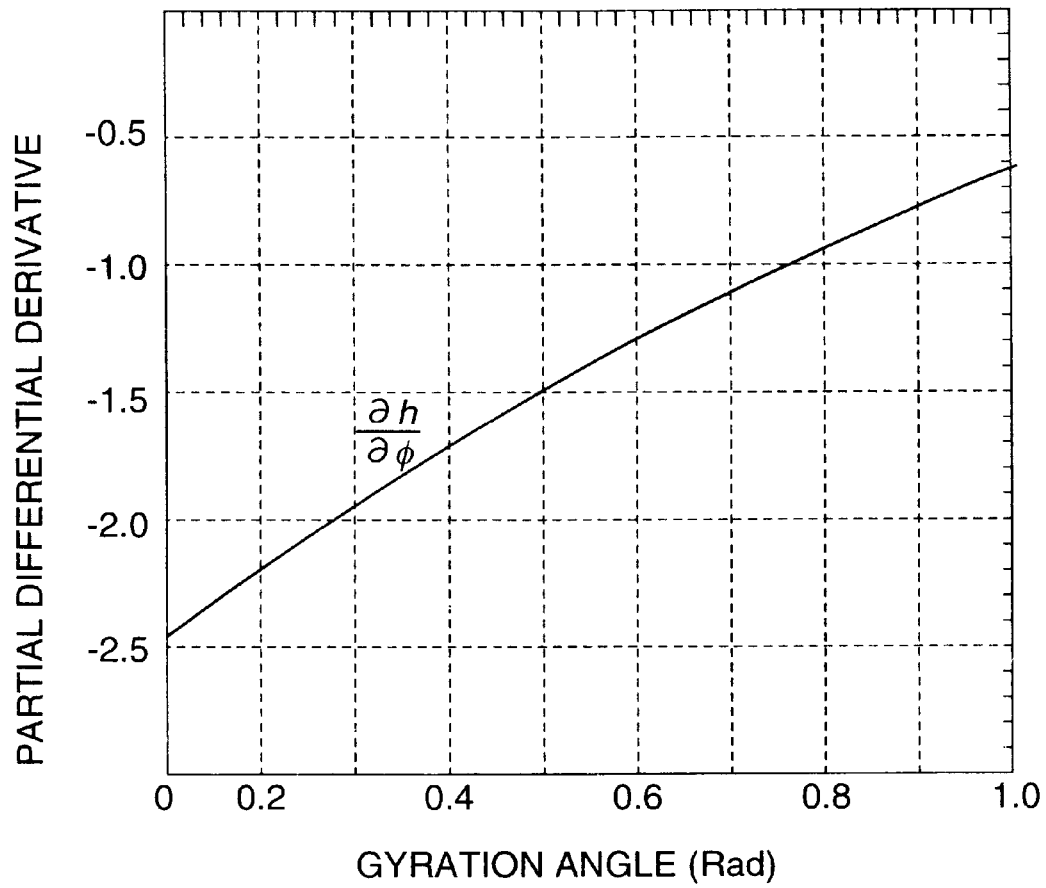
FIG. 8 is a diagram showing a relation between a partial differential derivative and the gyration angle $\phi$.

Further, the partial differential derivative multiplying unit 76 calculates a partial differential derivative by looking up a table of which the contents are shown in FIGS. 7 and 8 based on the current real speed ratio i. The table is previously stored in the controller 61.

It is of course possible to use a formula instead of a map. The partial differential derivative multiplying unit 76 then calculates a corrected amount v' by multiplying the control amount v by the partial differential derivative.

Here, the partial differential derivative corresponding to the current speed ratio i will be described.

If the dimensions of the transmission are specified as shown in FIG. 14, the relation between the real speed ratio i and gyration angle $\phi$ of the power roller 3 is shown by the following equation (9).

$$i = \frac{Ni}{No} = \frac{R_o}{R_i} \quad (9)$$
$$= \frac{1 + \eta - \cos(2\theta - \phi)}{1 + \eta - \cos\phi}$$

where,
Ni=input shaft rotation speed,
No=output shaft rotation speed,
Ri=radius of contact points between power rollers and input disc,
Ro=radius of contact points between power rollers and output disc, and
$\theta, \eta$=constants determined according to the dimensions of the transmission The above relation is non-linear as shown in FIG. 7.

In FIG. 7, if the real speed ratio i corresponding to the gyration angle $\phi$ is represented by a parameter $\eta$, the gyration angle $\phi$ may be expressed by $h^{-1}(i)$, and the partial differential derivative at the arbitrary speed ratio i may be calculated by the following equation (10).

$$\text{Partial differential derivative} = \frac{\partial}{\partial i} h^{-1}(i) \quad (10)$$

This partial differential derivative can be preset as a map according to the speed ratio i of the power roller as shown in FIG. 8.

As already mentioned, the control amount v output by the subtractor 56 is a value corresponding to a speed ratio obtained from the deviation e between the real speed ratio i and the target speed ratio i*, and gains based on the real speed ratio i, whereas the command value u is a value related to the gyration angle of the power rollers 3. The outputs of the feedforward path 81 and mechanical feedback cancelling path 82 are both output as values corresponding to the gyration angle processed considering the nonlinearity between the speed ratio and the gyration angle.

Therefore, to perform accurate speed ratio control, the value input from the subtractor 56 to the adder 57 must be a value corresponding not to the speed ratio, but to the gyration angle. The partial differential derivative multiplying unit 76 mentioned above has a function which, based on this of non-linear relation, converts the control amount v corresponding to the speed ratio into the corrected amount v' corresponding to the gyration angle.

The inverse function computing unit 77 calculates the gyration angle $\phi$ by applying the inverse $h^{-1}(i)$ of a function $h(\phi)$ of the speed ratio i corresponding to the gyration angle $\phi$, by the real speed ratio i output by the real speed ratio unit 71. Herein, the gyration angle $\phi$ obtained is therefore a value corresponding to a nonlinear relation between the speed ratio i and gyration angle $\phi$.

A multiplier 70 calculates the value obtained by multiplying the gyration angle $\phi$ by the cam ratio a, and the adder 57 adds this value to the aforesaid corrected amount v'.

The inverse function computing unit 77' of the feedforward path 81 uses the same inverse function $h^{-1}(i)$ as the inverse function computing unit 77.

However, here the target gyration angle $\phi^*$ is calculated using the target speed change ratio i* instead of the real speed ratio i. The multiplier 70' multiplies the value obtained by the cam ratio a, and the result is output to the change-over unit 79. This value too is a value corresponding to the nonlinear relation between the speed ratio i and gyration angle $\phi$.

The output signals from the feedback path 80 and feedforward path 81 are input to the change-over unit 79 comprising a low pass filter 83 shown in FIG. 3.

The change-over unit 79 selects the output signal of either the feedback path 80 or feedforward path 81, and after processing by the low pass filter 83, the result is output as the command value u. A step conversion unit 75 converts this command value u into a command signal STP which is output to the step motor 4.

Now, let us consider the linearization between the gyration angle φ and speed ratio i.

The dynamic characteristics of the toroidal continuously variable transmission are represented by the following equation (11).

$$\frac{dx_2}{dt} = fx_1 \quad (11)$$

$$\frac{dx_1}{dt} = -a \cdot g \cdot x_2 - b \cdot g \cdot x_1 + g \cdot u$$

$$i = h(x_2)$$

where, $x_1$=offset amount of power rollers, i.e., offset amount of the axis $O_1$ in the direction of the axis $O_3$ relative to the axis $O_2$, and $x_2$=gyration angle φ of power rollers.

The relation between the command value u and speed ratio i may be expressed by the following equation (12).

$$\frac{d^2 i}{dt^2} = \frac{d}{dt}\left[\left\{\frac{\partial h}{\partial x_2}\right\}\frac{d}{dt}x_2\right] \quad (12)$$

$$= \frac{d}{dt}\left[\left\{\frac{\partial h}{\partial x_2}\right\} \cdot f \cdot x_1\right]$$

$$= \left\{\frac{d}{dt}\frac{\partial h}{\partial x_2}\right\} \cdot f \cdot x_1 + \left\{\frac{\partial h}{\partial x_2}\right\} \cdot f \cdot \frac{d}{dt}x_1$$

Here, the following equation (13) holds.

$$\left\{\frac{d}{dt}\frac{\partial h}{\partial x_2}\right\} = 0 \quad (13)$$

Rewriting equation (12) based on this equation (13) and the previous equation (11), the following equation (14) is obtained.

$$\frac{d^2 i}{dt^2} = \left\{\frac{\partial h}{\partial x_2}\right\} \cdot f \cdot (-a \cdot g \cdot x_2 - b \cdot g \cdot x_1 + g \cdot u) \quad (14)$$

$$= \left\{\frac{\partial h}{\partial x_2}\right\} \cdot f \cdot \left\{-a \cdot g \cdot h^{-1}(i) - \frac{b \cdot g}{f} \cdot \frac{d}{dt}x_2 + g \cdot u\right\}$$

$$= \left\{\frac{\partial h}{\partial x_2}\right\} \cdot \left[-a \cdot g \cdot f \cdot h^{-1}(i) - b \cdot g \cdot \frac{d}{dt}\{h^{-1}(i)\} + g \cdot u\right]$$

$$= \left\{\frac{\partial h}{\partial x_2}\right\} \cdot \left\{-a \cdot g \cdot f \cdot h^{-1}(i) - b \cdot g \cdot \frac{\partial h^{-1}}{\partial i}\frac{di}{dt} + g \cdot f \cdot u\right\}$$

$$= -a \cdot g \cdot f \cdot \frac{\partial h}{\partial x_2} \cdot h^{-1}(i) - b \cdot g \cdot \frac{\partial h}{\partial x_2} \cdot \frac{\partial h^{-1}}{\partial i} \cdot \frac{di}{dt} + g \cdot f \cdot \frac{\partial h}{\partial x_2} \cdot u$$

Here, the following equation (15) holds.

$$\frac{\partial h}{\partial x_2} \cdot \frac{\partial h^{-1}}{\partial i} = 1 \quad (15)$$

Substituting equation (15) in equation (14), the following equation (16) is obtained.

$$\frac{d^2 i}{dt^2} = -a \cdot g \cdot f \cdot \frac{\partial h}{\partial x_2} \cdot h^{-1}(i) - b \cdot g \cdot \frac{di}{dt} + g \cdot f \cdot \frac{\partial h}{\partial x_2} \cdot u \quad (16)$$

Here, the processing performed by the mechanical feedback cancelling path 82 will be considered.

Figure 4A:
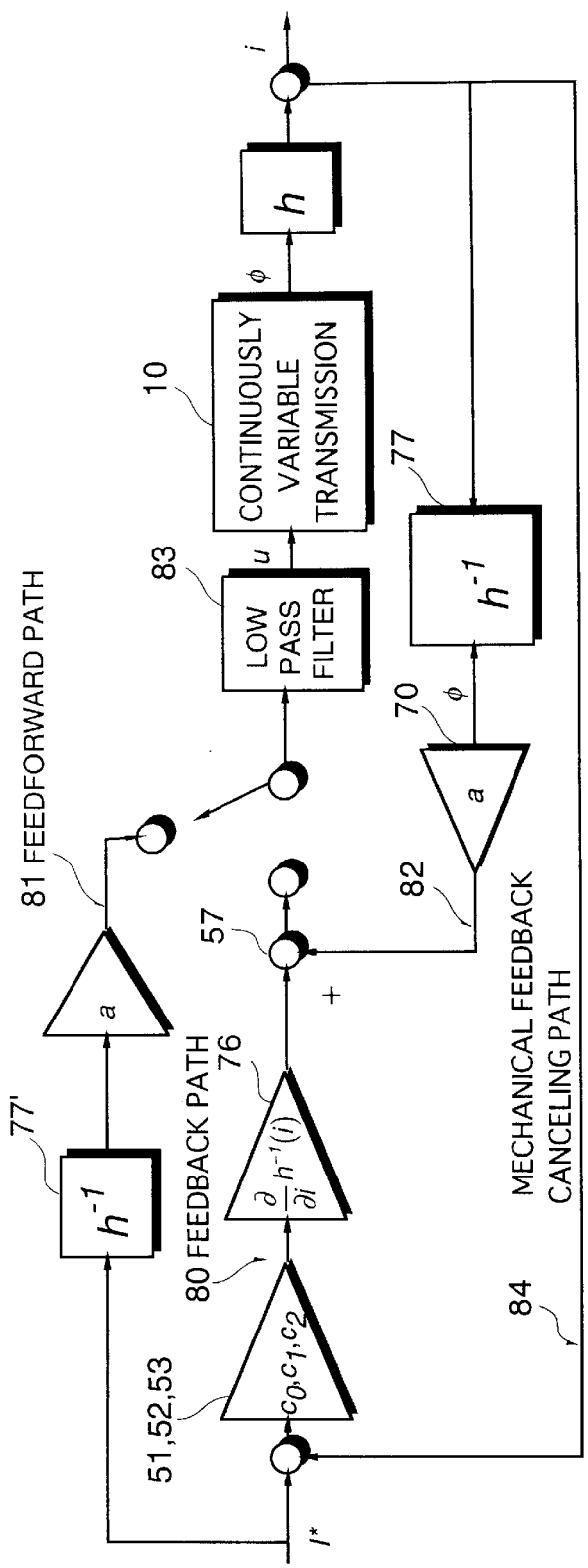
FIGS. 4A and 4B are block diagrams which compare speed ratio control performed by the controller with speed ratio control according to the prior art.
Figure 4B:
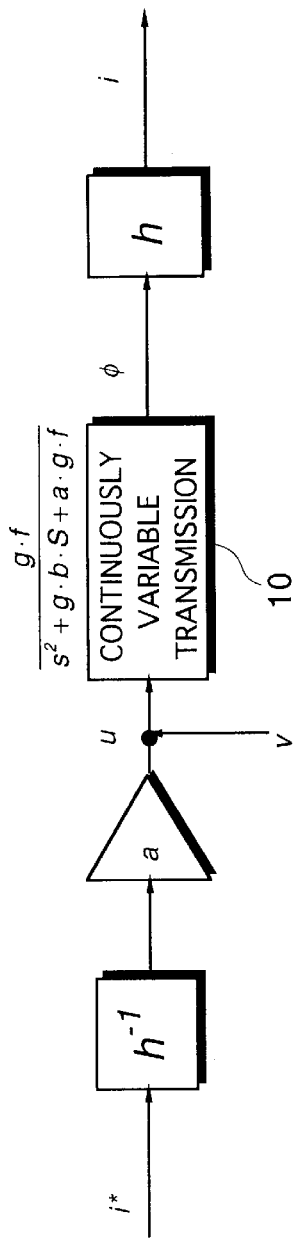

The relation between the control amount v and the command value u in Tokkai Hei 9-53716 of the aforesaid prior art example is shown in FIG. 4B and the following equation (17).

$$u = a \cdot h^{-1}(i) + v$$

When this relation is substituted in equation 16, the following equation (18) is obtained.

$$\frac{d^2 i}{dt^2} = -a \cdot g \cdot f \cdot \frac{\partial h}{\partial x_2} \cdot h^{-1}(i) - \quad (18)$$

$$b \cdot g \cdot \frac{di}{dt} + a \cdot g \cdot f \cdot \frac{\partial h}{\partial x_2} \cdot h^{-1}(v) + g \cdot f \cdot \frac{\partial h}{\partial x_2} \cdot v$$

$$= -a \cdot g \cdot f \cdot \frac{\partial h}{\partial x_2}\{h^{-1}(i) - h^{-1}(v)\} +$$

$$g \cdot f \cdot \frac{\partial h}{\partial x_2} \cdot v - b \cdot g \cdot \frac{di}{dt}$$

In this equation, the relation between the control amount v and command value u is not linearized.

On the other hand, the relation between the control amount v and command value u when the partial differential derivative multiplying unit 76 is provided as shown in FIG. 4A, is shown by the following equation (19).

$$u = a \cdot h^{-1}(i) + \frac{\partial}{\partial i}h^{-1}(v) \quad (19)$$

When this relation is substituted in equation 16, the following equation (20) is obtained.

$$\frac{d^2 i}{dt^2} = -b \cdot g \cdot \frac{di}{dt} + g \cdot f \cdot \frac{\partial h}{\partial x_2} \cdot \frac{\partial h^{-1}}{\partial i}v \quad (20)$$

$$= -b \cdot g \cdot \frac{di}{dt} + g \cdot f \cdot v$$

Due to this, the relation between the control amount v and command value u is made linear. In other words, the non-linear relation between the gyration angle and speed ratio i is compensated.

This may be expressed as a transfer function by the following equation (21).

$$G_p(s) = \frac{g \cdot f}{s \cdot (s + g \cdot b)} \quad (21)$$

This is a transfer function equivalent to that of the prior art wherein mechanical feedback cancellation processing was performed on the gyration angle φ as the object of control.

In other words, the non-linear relation between the gyration angle and speed ratio i is compensated. Therefore, high precision speed ratio control may be performed without the kind of error occurring in the aforesaid prior art of Tokkai Hei 9-53716 even if the target value is given in a form of the speed ratio.

The construction of the change-over unit 79 which changes over between feedback control and feed forward control will next be described referring to FIG. 3.

The change-over unit 79 comprises a low pass filter 83, a change-over determining unit 793 which selectively connects either the feedforward path 81 or the feedback path 80 to the low pass filter 83 based on the vehicle speed VSP and oil temperature Temp, and a time constant determining unit 792 which determines a time constant κ of the low pass filter 83 depending on the vehicle running state.

The time constant determining unit 792 determines the time constant κ of the low pass filter 83 based on the vehicle speed VSP, oil temperature Temp, line pressure PL and real speed ratio i referring to a map, not shown. As shown in FIG. 3, this time constant κ is applied in the lowpass filter 83 in the form of a gain 1/κ. When the input path to the low pass filter 83 changes over from the feedforward path 81 to the feedback path 80, the time constant κ is increased, i.e., the gain 1/κ is decreased, to suppress fluctuation of a low pass filter output u.

Further, when a predetermined time has elapsed from this change-over, the time constant κ is decreased, i.e., the gain 1/κ is increased, to prevent deterioration of the response of feedback control.

The reason why the time constant is increased immediately after the input path to the low pass filter is changed over from the feedforward path 81 to the feedback path 80, is as follows.

As the target value of feed forward control does not necessarily coincide with the target value of feedback control, a difference may arise in the target value due to the above change-over, and this difference may cause an uncomfortable speed change shock.

Therefore, when the input path to the low pass filter 83 is changed over, the time constant κ is set large to absorb the error in the target value. Also, the time constant κ is set small after absorption so that the response of feedback control does not remain low.

By varying the setting of the time constant κ according to the vehicle speed VSP, oil temperature Temp, line pressure PL and speed ratio i, the time constant κ is made to vary according to the magnitude of any difference in the target values before and after a change-over of the input path.

Therefore, unnecessary increase of the time constant κ is prevented.

Next, the speed ratio control routine performed by the controller 61 will be described referring to the flowcharts of FIGS. 5 and 6.

Figure 5:
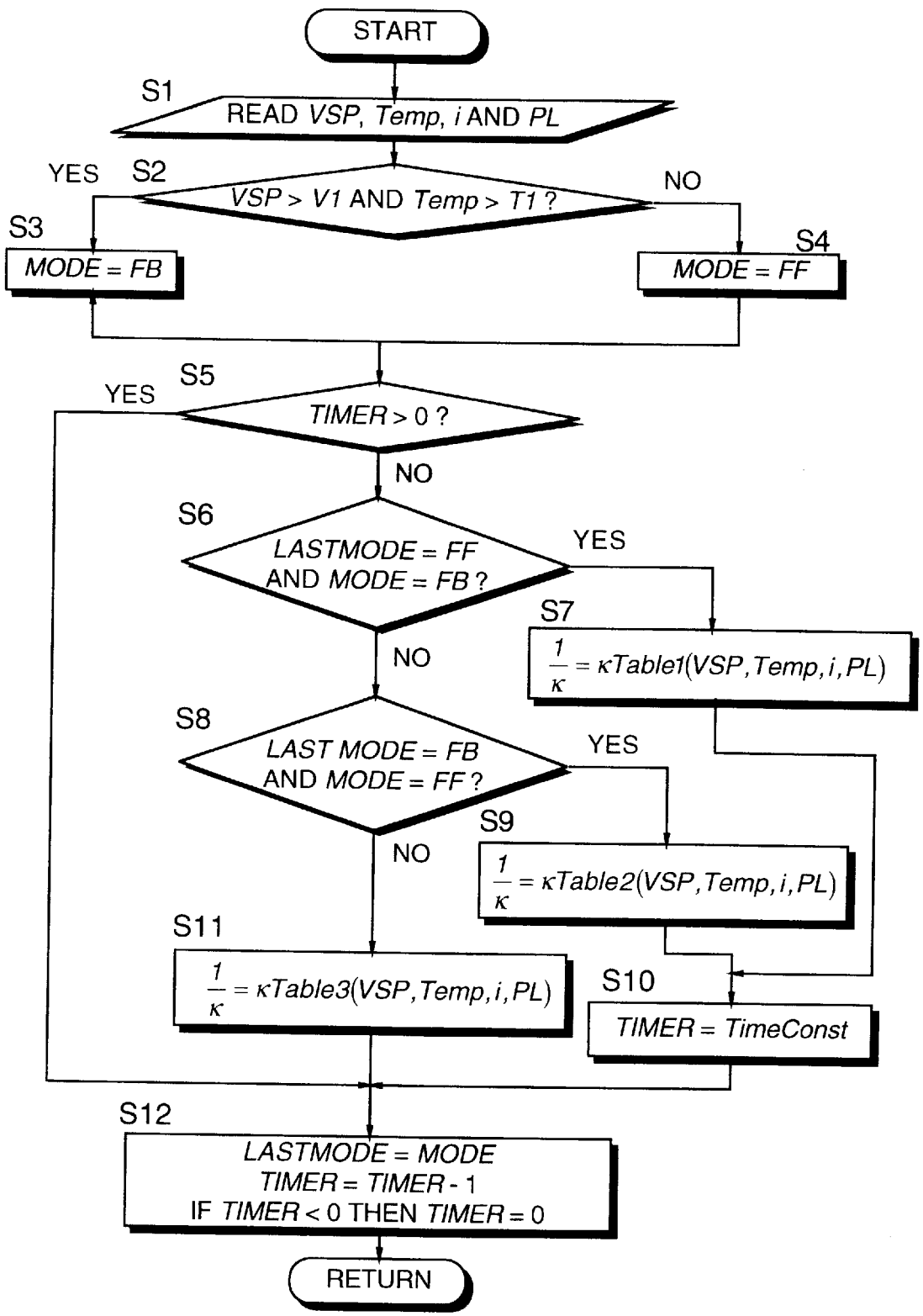
FIG. 5 is a flowchart describing a speed ratio control change-over process performed by the controller.
Figure 6:
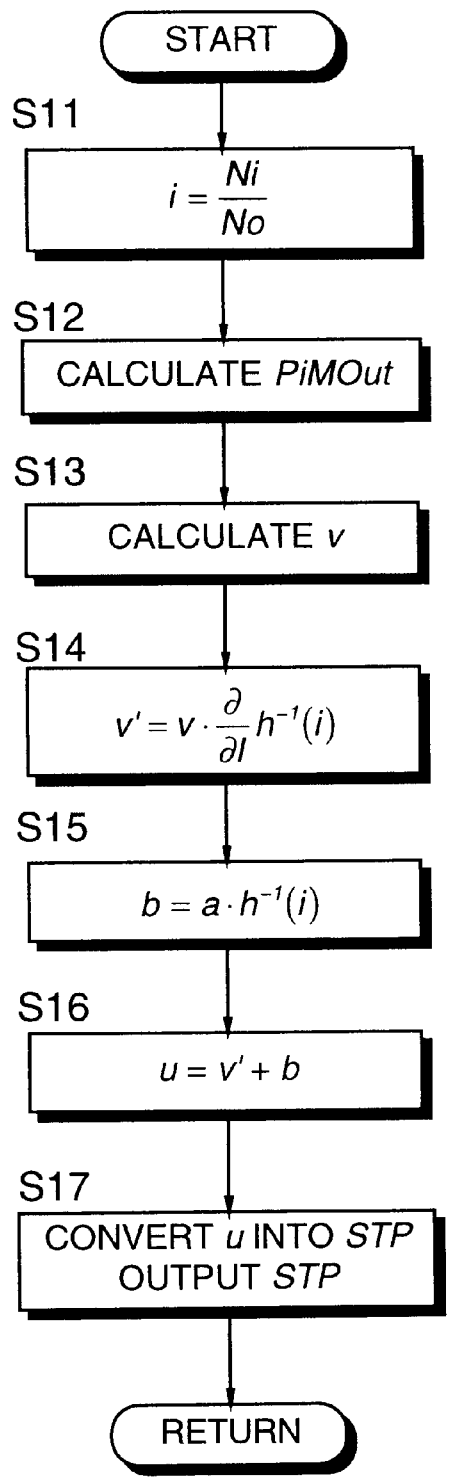
FIG. 6 is a flowchart describing a speed ratio feedback control process performed by the controller.

FIG. 5 shows a routine for change-over between feed forward control and feedback control of the speed ratio. This routine corresponds to the function of the change-over unit 79. This routine is performed at an interval of, for example, 10 milliseconds.

First, in a step S1, the controller 61 reads the input shaft rotation speed Ni, vehicle speed VSP, oil temperature Temp and line pressure PL from sensors. The real speed ratio i is also calculated.

In a step S2, it is determined whether the present vehicle running state is under feedback control or feed forward control.

When the vehicle speed VSP exceeds a threshold value V1 and the oil temperature Temp exceeds a threshold value T1, the routine proceeds to a step S3 and selects the feed forward path. In all other cases, the routine proceeds to a step S4 and selects the feedforward path.

In the step S3, a control mode flag MODE is set to FB showing feedback control, and the routine proceeds to a step S5. In the step S4, the control mode flag MODE is set to FF showing feed forward control, and the routine proceeds to the step S5.

In the step S5, it is determined whether or not the value of a variable TIMER is positive. The variable TIMER is a variable showing an elapsed time from change-over from feed forward control to feedback control.

If the variable TIMER is a positive value, it shows that the aforesaid change-over has already been made.

In this case, the routine proceeds to a step S12. If the variable TIMER is 0 or a negative value, the routine proceeds to a step S6.

In the step S6, it is determined whether a variable LASTMODE which stores the control mode flag MODE on the immediately preceding occasion when the routine was performed is FF, and the control mode flag MODE on the present occasion when the routine is performed is FB. In other words, from the steps S2–S4 on the present occasion when the routine is performed, it is determined whether or not the control mode flag has changed over from FF to FB. When the result of this determination is affirmative, the routine proceeds to a step S7.

In the step S7, the gain 1/κ of the low pass filter 83 is determined based on the vehicle speed VSP, oil temperature Temp, real speed ratio i and line pressure PL read in the step S1 by looking up a table kTable1 previously stored in the controller 61. After this processing, the routine proceeds to a step S10.

On the other hand, if the determining result of the step S6 is negative, it is determined in a step S8 whether the variable LASTMODE is FB, and the control mode flag MODE on the present occasion when the routine is performed is FF. In other words, it is determined whether or not the control mode flag has changed over from FB to FF due to the process of the steps S2–S4 on the present occasion when the routine is performed. When the result of this determination is affirmative, the routine proceeds to a step S9. When the result of this determination is negative, the routine proceeds to a step S11.

In the step S9, the gain 1/κ of the low pass filter 83 is determined based on the vehicle speed VSP, oil temperature Temp, real speed ratio i and line pressure PL read in the step Si by looking up a table kTable2 previously stored in the controller 61. After this processing, the routine proceeds to the step S10.

The routine only proceeds to the step S10 immediately after the control conditions have changed over from feed forward to feedback, or vice versa.

In the step S10, a fixed value TimeConst is set as the variable TIMER. Once the processing of the step S10 is performed, therefore, a timer countdown is performed on every subsequent occasion the routine is executed. After the processing of the step S10, the routine proceeds to a step S12.

On the other hand, in the step S11, the gain 1/κ of the low pass filter 83 is determined based on the vehicle speed VSP, oil temperature Temp, real speed ratio i and line pressure PL read in the step SI by looking up a table kTable3 previously stored in the controller 61. After this processing, the routine proceeds to a step S12.

In the step S12, the value of the current control mode flag MODE is stored in the variable LASTMODE which stores the immediately preceding value, and the variable TIMER is decremented. If the variable TIMER is negative after decrementing, the variable TIMER is reset to 0.

Here, the specification of kTable1–kTable3 will be described.

kTable3 is a table for ordinary control, whereas kTable1 and kTable2 are tables for change-over of the control path. KTable3 is set to give a smaller time constant, i.e., a larger gain, than kTable1 and kTable2. As a result, when there is a change-over of the input path, the time constant K of the low pass filter 83 is set large, i.e., the gain 1/κ is set small, to absorb the difference in the control target values before and after the change-over.

Otherwise, if the variable TIMER is negative, it is determined that absorption of this difference is complete, and the time constant K is returned to its value under normal conditions.

In this routine, if the vehicle speed VSP and oil temperature Temp exceeded the threshold values V1, T1 respectively, a change-over is performed from the feedforward path to the feedback path. Provided that the vehicle continues to be driven, the oil temperature Temp does not fall below the threshold value T1. Therefore, a change-over from the feedback path to the feedfoward path is performed when the vehicle speed VSP falls below the threshold value V1.

The reason for using different tables kTable1 and kTable2 depending on the path change-over direction is as follows. Change -over from the feedback path to the feed forward path is performed when the vehicle speed VSP is decreasing as described above, i.e., when the vehicle is decelerating. The shock due to change of the speed ratio is less during deceleration than during acceleration. Therefore, kTable2 is set to give a smaller time constant κ, i.e., a larger gain 1/κ, than kTable1.

Next, the feedback control routine performed by the controller 61 will be described referring to the flowchart of FIG. 6. This routine corresponds to the function of the feedback path 80 shown in FIG. 2. This routine is performed at an interval of, for example, 10 milliseconds.

First, in a step S11, the controller 61 calculates the real speed ratio i by dividing the input shaft rotation speed Ni by the output shaft rotation speed No. This step corresponds to the real speed ratio computing unit 71.

In a step S12, the offset amount y of the power roller is estimated from the real speed ratio i and control amount v output on the preceding occasion when the routine was performed. Then, a value PiMOut is computed by multiplying this estimated value by the differential gain $c_2$. This step corresponds to the y displacement estimating unit 72 and multiplier 53.

In a step S13, the integral value of the deviation e between the target speed ratio i* and real speed ratio i is multiplied by the integral gain $c_0$.

A value obtained by multiplying the deviation e by a proportional gain $C_1$ is added to this calculation result, and PiMOut which was found in the step S12 is subtracted to compute the control amount v. This step corresponds to the subtractor 54, integrator 74, multipliers 51, 52, adder 55 and subtractor 56.

In a step S14, the control amount v is multiplied by the partial differential derivative of equation (10) which is a function of the real speed ratio i so as to give the corrected amount v' as expressed by the following equation (22).

$$v' = v \cdot \frac{\partial}{\partial i} h^{-1}(i) \qquad (22)$$

This step corresponds to the partial differential derivative multiplying unit 76.

In a step S15, the inverse function $h^{-1}(i)$ is applied to the real speed ratio i so as to calculate the gyration angle φ of the power rollers. The gyration angle φ is then multiplied by the cam ratio a to give the mechanical feedback amount b. This step corresponds to the inverse function computing unit 77 and multiplier 70.

In a step S16, the mechanical feedback amount b is added to the corrected amount v' obtained in the step S14, and the result is then converted into the command value u.

This step corresponds to the adder 57 and change-over unit 79.

In a step S17, the command value u is converted into the command signal STP which is output to step motor 4. This step corresponds to the step conversion unit 75.

The nonlinear nature of the speed ratio i and gyration angle φ may be compensated by forming a non-linear feedback path from the inverse function $h^{--}(i)$ of the speed ratio i as a function of the gyration angle φ and partial differential derivative of equation (10) as described above.

Therefore, the error which occurs when it is assumed that the speed ratio i and gyration angle φ are in a linear relationship to one another as in the prior art can be corrected, and high precision, high speed control of the transmission can be performed while using a linear control system.

Also, the occurrence of a speed change shock due to a difference of the control target values before and after the change-over of the input path can be suppressed by changing the time constant κ during a predetermined period after the change-over.

In the routine in FIG. 5, a different time constant κ was used when changing over from feed forward control to feedback control and vice versa, but the same time constant may be used in both cases. Further, a change-over time constant was applied for a predetermined time after changeover, however a decrease of speed change shock may also be obtained even if it is applied only during the change-over.

Next, a second embodiment of this invention will be described referring to FIGS. 10–13.

According to this embodiment, the inverse function computing unit 77 and multiplier 70 of the aforesaid first embodiment are disposed immediately before the step conversion unit 75, and the feedforward path 81 and partial differential derivative multiplying unit 76 are omitted. An adder 90 which adds the real speed ratio i to the control amount v is disposed between the subtractor 56 and inverse function computing unit 77. Further, the gain calculating unit 73 has a different construction from that of the aforesaid first embodiment. The remaining features of the construction are the same as those of the aforesaid first embodiment.

In addition to computing the feedback gains $c_0$, $c_1$, $c_2$ according to running conditions as in the case of the aforesaid first embodiment, the gain computing unit 73 further comprises gain change-over units 735A–735C, low pass filters 734A–734C, change-over determining unit 733 and time constant determining unit 732 as shown in FIG. 11.

Figure 12:
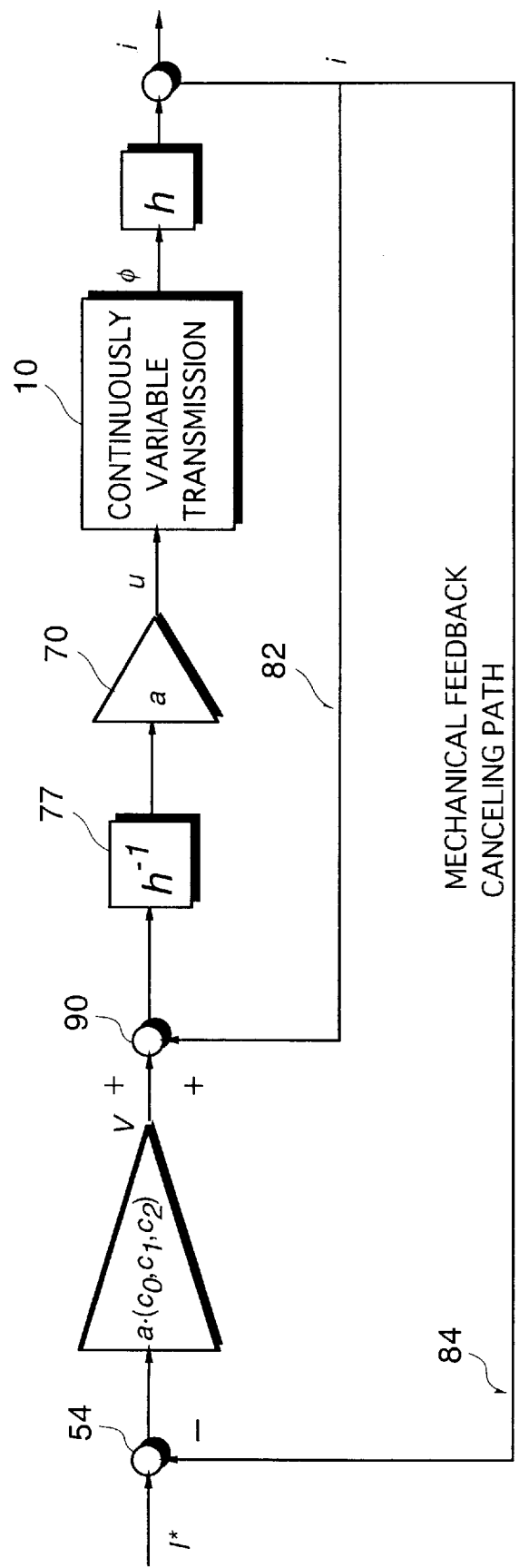
FIG. 12 is a block diagram describing a feedback control function of the controller according to the second embodiment.

The gain change-over unit 735A changes over between the feedback gain $c_1$ and a constant 1. The gain change-over unit 735B changes over between the feedback gain $c_0$ and a constant 0. The gain change-over unit 735C changes over between the feedback gain $c_2$ and a constant 0. If the proportional gain $c_0$=1, integral gain $c_1$=0 and differential gain $c_2$=0, the total feedback gain is 1. In this case, as the input of mechanical feedback canceling path 70 and the input of the speed ratio feedback path 84 cancel each other out as shown in FIG. 12, feedforward control according to the target speed ratio i* is actually applied.

A gain change-over by the gain change-over units 735A–735C is performed based on a determination of the change-over determining unit 733.

The change-over determining unit 733 has a function to determine a change-over between feedback control and feed forward control based on the vehicle speed VSP and oil temperature Temp.

The time constant determining unit 732 determines time constants $\kappa c_0$, $\kappa c_1$, $\kappa c_2$ of the low pass filters 734A–734C based on the output of the change-over determining unit 733, vehicle speed VSP, oil temperature Temp, real speed ratio i and line pressure PL.

The low pass filters 734A–734C apply the time constants $\kappa c_0$, $\kappa c_1$, $\kappa c_2$ determined by the time constant determining unit 732 to the input signal, and perform a predetermined delay processing. As shown in FIG. 11, these time constants $\kappa c_0$, $\kappa c_1$, $\kappa c_2$ are applied in the lowpass filters 734A–734C as gains $1/\kappa c_0$, $1/\kappa c_1$, $1/\kappa c_2$. Due to this, the feedback gain output by the gain calculating unit 73 is not made to vary sharply as a result of a gain change-over of the gain change-over units 735A–735C. Consequently, a speed change shock when there is a change over between feed forward control and feedback control is prevented from occurring.

Figure 13:
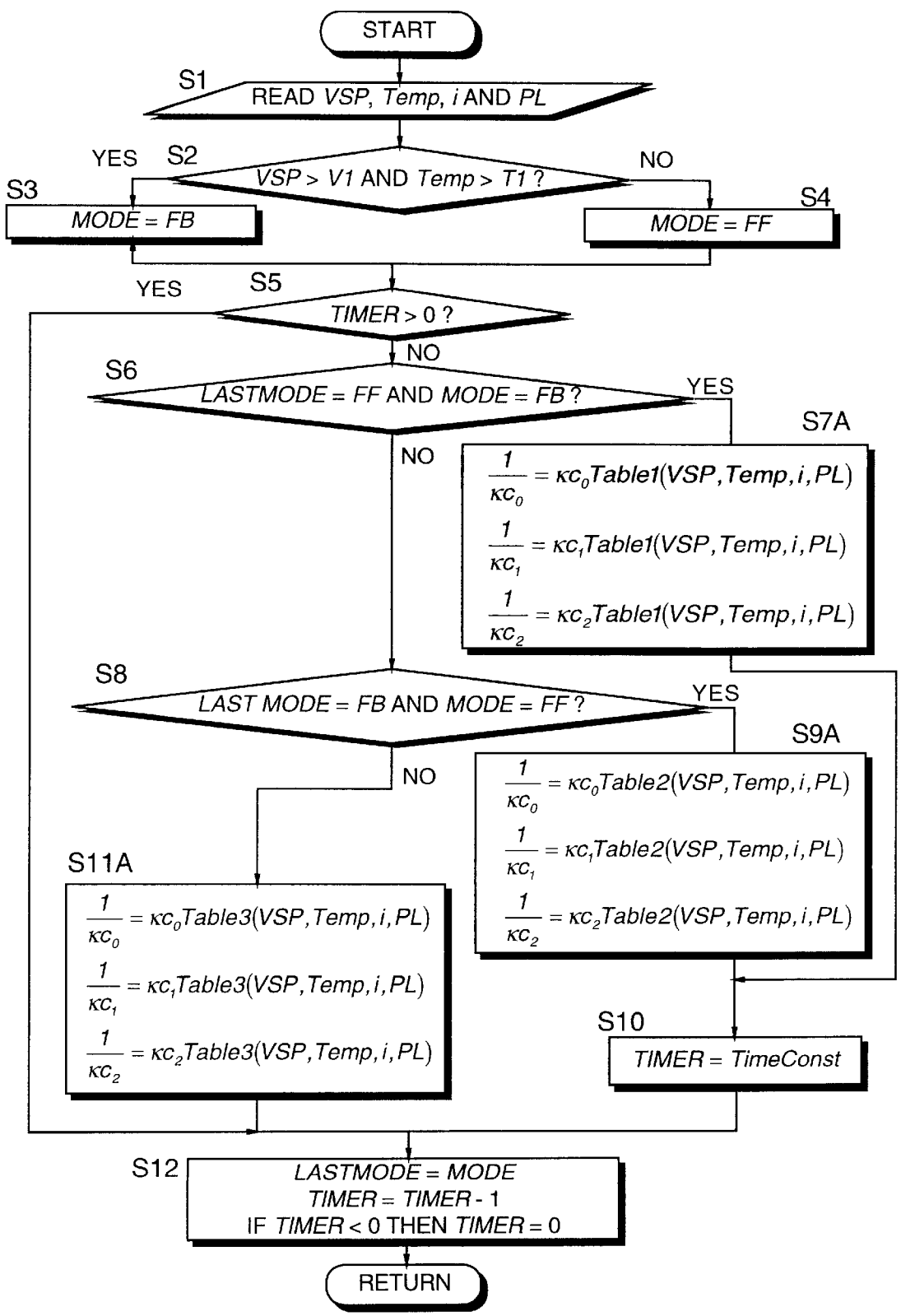
FIG. 13 is a flowchart describing a speed ratio control process performed by the controller according to the second embodiment.

In this embodiment, the change-over routine of feed forward control and feed back control performed by the controller 61 is shown in FIG. 13. This routine corresponds to replacing the steps S7, S9 and S11 of the routine of FIG. 5 of the aforesaid first embodiment by steps S7A, S9A and S11A respectively.

In the step S7A, tables kc0_Table1, kc1_Table1 and kc2_Table1 stored in the controller 61 beforehand are respectively searched based on the vehicle speed VSP, oil temperature Temp, real speed ratio i and line pressure PL, read in the step SI, and the gains $1/\kappa c_0$, $1/\kappa c_1$ and $1/\kappa c_2$ of the low pass filters 734A–734C are determined.

In a step S9A, similar tables kc0_Table2, kc1_Table2 and kc2_Table2 are searched, and the gains $1/\kappa c_0$, $1/\kappa c_1$ and $1/\kappa c_2$ of the low pass light filters 734A–734C, are determined.

In a step S11A, similar tables kc0_Table3, kc1_Table3 and kc2_Table3 are searched, and the gains $1/\kappa c_0$, $1/\kappa c_1$ and $1/\kappa c_2$ of the low pass light filters 734A–734C, are determined.

Of the three kinds of table mentioned above, the tables kc0_Table1, kc1_Table1 and kc2_Table1 give the largest time constants, i.e., the smallest gains, when the vehicle speed VSP, oil temperature Temp, real speed ratio i and line pressure PL are in an identical state. The tables kc0_Table2, kc1_Table2 and kc2_Table2 give the second largest time constants, i.e., the second smallest gains, and the tables kc0_Table3, kc1_Table3 and kc2_Table3 give the smallest time constants, i.e., the largest gains.

The processing of other steps is identical to that of the routine of FIG. 5.

According to this embodiment, the non-linear relation between the speed ratio i and gyration angle φ is compensated as follows. First, in FIG. 12, the adder 90 adds the real speed ratio i input from the mechanical feedback canceling path 82 to the control amount v, and inputs the result into the inverse function computing unit 77.

The inverse function computing unit 77 calculates the gyration angle ¢ from the real speed ratio i using the inverse function $h^{-1}(i)$ of function h(φ) shown in FIG. 7. The multiplier 70 multiplies the gyration angle φ by the cam ratio a to calculate the command value u.

The command value u is expressed by the following equation 23 using the partial differential derivative and the inverse function for any speed ratio i as in the case of the first embodiment.

$$u = a \cdot h^{-1}(i) + a \cdot \left(\frac{\partial h^{-1}}{\partial i}\right) \cdot v \quad (23)$$

The command value u given by the above equation 23 is almost equal to the value given by the equation (9) when the control amount v is small. Since, in the equation (23), the second term is multiplied by the cam ratio a, the control amount which is calculated by the subtractor 56 is previously multiplied by 1/a by the multiplier 100 in FIG. 100 and the result is output as the control amount v. The transfer function from the control amount v to the speed ratio i is expressed by the following equation (24), or in other words, the feedback control gain is multiplied by the cam ratio a as shown in FIG. 12.

$$G_p(s) = \frac{a \cdot g \cdot f}{s \cdot (s + g \cdot b)} \quad (24)$$

If there is no difference in assuming that the relation between the speed ratio and gyration angle is linear or non-linear, the speed ratio i becomes steady when v=0. In other words, the control amount v acts as a correction amount on the difference.

According to the second embodiment, the inverse function computing unit 77 and multiplier 55 of the cam ratio a provided in the mechanical feedback canceling path 82 of the first embodiment, are used instead of the partial differential derivative function multiplying unit 76, so the non-linear function for the mechanical feedback canceling path 82 and that used for correction of the corrected amount v' are made common, and the control process is thereby simplified.

The aforesaid embodiments concerned the application of this invention to a toroidal continuously variable transmission, but this invention may be applied also to other transmissions. U.S. Pat. No. 5,857,397, the disclosure of which is herein incorporated by reference, discloses a V-belt continuously variable transmission.

In this V-belt continuously variable transmission, the width of a groove of a drive pulley is varied by the oil pressure supplied from a control valve. The control valve is driven by a step motor. The drive pulley and control valve are connected by a link which is a mechanical feedback mechanism.

In this V-belt continuously variable transmission also, the relation between the groove width of the drive pulley and the speed ratio is non-linear.

To apply this invention to this type of V-belt continuously variable transmission, the relation between the gyration angle φ and the speed ratio i may therefore be replaced by a relation between the displacement amount of a movable conical plate of the drive pulley, i.e., the variation of the groove width of the pulley, and the speed ratio i.

If the contact radius between the drive pulley and V-belt is ri, and the contact radius between the driven pulley and V-belt is rO, the speed ratio i is given by the following equation (25).

$$i = ro/ri \quad (25)$$

Here, ri and ro are represented by the following equations (26) and (27).

$$ri = \frac{Ds}{2 \cdot \tan\beta} + ri_0 \quad (26)$$

$$ro = \frac{2 \cdot ri - \pi \cdot Dc + \sqrt{(2 \cdot ri - \pi \cdot Dc)^2 - 4 \cdot \{ri^2 + Dc \cdot ri + Dc \cdot (2 \cdot Dc - L_B)\}}}{2} \quad (27)$$

where,
Ds=displacement amount in the axial direction of movable conical plate
$ri_0$=minimum contact radius between the drive pulley and V-belt, Dc=distance of rotation axis of rotation axis of drive pulley from rotation axis of driven pulley, $L_B$=circumference of V-belt, and b=sheave angle of pulley.

This invention may be applied to compensating the non-linear relation between the groove width of the drive pulley of the V-belt continuously variable transmission and the speed ratio by replacing the aforesaid equation 9 by the equations 25–27. This invention is also effective for reducing the speed change shock due to change-over between feed forward control and feed back control of a V-belt continuously variable transmission.

The contents of U.S. Pat. No. 5,857,397, Tokugan Hei 10-186066, with a filing date of Jul. 1, 1998 in Japan, and Tokugan Hei 10-207901, with a filing date of Jul. 23, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

1. A speed ratio controller of a continuously variable transmission for a vehicle, said continuously variable transmission continuously changing a speed ratio by displacement of a speed change medium in response to an actuator, said controller comprising:

sensors for detecting a real speed ratio, and a microprocessor programmed to:

calculate a target speed ratio i* of said transmission, calculate a control amount v of said actuator so that said real speed ratio i coincides with the target speed ratio i*, calculate a command value u by correcting said control amount v based on a non-linear relation between said displacement and said real speed ratio, and control said actuator based on the command value u, wherein said speed change medium comprises a power roller which varies said real speed ratio i according to a variation of a gyration angle φ of said power roller, said displacement is represented by said gyration angle φ, and said microprocessor is programmed to calculate said command value u by multiplying said control amount v by an inverse function $h^{-1}(i)$ of a first function h(φ), said first function h(φ) representing said real speed ratio i by said gyration angle φ.

2. A speed ratio controller as defined in claim 1, wherein said transmission comprises a control valve which varies said gyration angle φ hydraulically and mechanical feedback mechanisms which mechanically feedback a variation of said gyration angle to said control valve, and said microprocessor is programmed to calculate a mechanical feedback amount b due to said mechanical feedback mechanisms based on said inverse function $h^{-1}(i)$, calculate a corrected control amount v' by multiplying said control amount v by a partial differential derivative function $$\frac{\partial}{\partial i} h^{-1}(i)$$

of said inverse function $h^{-1}(i)$, and calculate said command value u by adding said mechanical feedback amount b to said corrected control amount v'.

3. A speed ratio controller of a continuously variable transmission for a vehicle, said continuously variable transmission continuously changing a speed ratio by displacement of a speed change medium in response to an actuator, said controller comprising:

sensors for detecting a real speed ratio, and a microprocessor programmed to:

calculate a target speed ratio i* of said transmission, calculate a control amount v of said actuator so that said real speed ratio i coincides with the target speed ratio i*, calculate a command value u by correcting said control amount v based on a non-linear relation between said displacement and said real speed ratio, and control said actuator based on the command value u, wherein said speed change medium comprises a power roller which varies said real speed ratio i according to a variation of a gyration angle φ of said power roller, said displacement is represented by said gyration angle φ, said transmission comprises a control valve which varies said gyration angle φ hydraulically and a mechanical feedback mechanism which mechanically feeds back a variation of said gyration angle φ to said control valve, and said microprocessor is programmed to calculate a mechanical feedback amount due to said mechanical feedback mechanism based on said real speed ratio i, calculate a corrected control amount v' by adding said mechanical feedback amount to said control amount v, and calculate said command value u by applying an inverse function $h^{-1}(i)$ of a first function h(φ) representing said real speed ratio i by said gyration angle φ, to said corrected control amount v'.

4. A speed ratio controller of a continuously variable transmission for a vehicle, said continuously variable transmission continuously changing a speed ratio by displacement of a speed change medium in response to an actuator, said controller comprising:

sensors for detecting a real speed ratio, and a microprocessor programmed to:

calculate a target speed ratio i* of said transmission, calculate a control amount v of said actuator so that said real speed ratio i coincides with the target speed ratio i*, calculate a command value u by correcting said control amount v based on a non-linear relation between said displacement and said real speed ratio, and control said actuator based on the command value u, wherein said speed change medium comprises a pulley comprising a movable conical plate, said movable conical plate varying said real speed ratio i according to a variation of a conical plate displacement, and said microprocessor is programmed to calculate said command value u by correcting said control amount v based on a non-linear relation between said conical plate displacement and said real speed ratio, wherein said microprocessor is programmed to calculate said command value u by correcting said control amount v based on an inverse function $h^{-1}$ of a function h, said function h representing said conical plate displacement by said real speed ratio i.

5. A speed ratio controller of a continuously variable transmission for a vehicle, said continuously variable transmission continuously changing a speed ratio by displacement of a speed change medium in response to an actuator, said controller comprising:

sensors for detecting a real speed ratio, and a microprocessor programmed to:
calculate a target speed ratio i* of said transmission,
calculate a control amount v of said actuator so that said real speed ratio i coincides with the target speed ratio i*,
calculate a command value u by correcting said control amount v based on a non-linear relation between said displacement and said real speed ratio, and
control said actuator based on the command value u,
wherein said microprocessor is programmed to calculate a feed forward control amount of said actuator based on said target speed ratio i*, and selectively apply said command value u or said feed forward control amount to control said actuator,
wherein said speed change medium comprises a power roller which varies said real speed ratio i according to a variation of the gyration angle $\phi$ of said power roller, said displacement is represented by said gyration angle $\phi$, and said microprocessor is programmed to calculate said feed forward control amount based on an inverse function $h^{-1}(i)$ of a first function $h(\phi)$, said first function $h(\phi)$ representing said real speed ratio i by said gyration angle $\phi$.

6. A speed ratio controller of a continuously variable transmission for a vehicle, said continuously variable transmission continuously changing a speed ratio by displacement of a speed change medium in response to an actuator, said controller comprising:
sensors for detecting a real speed ratio, and
a microprocessor programmed to:
calculate a target speed ratio i* of said transmission,
calculate a control amount v of said actuator so that said real speed ratio i coincides with the target speed ratio i*,
calculate a command value u by correcting said control amount v based on a non-linear relation between said displacement and said real speed ratio, and
control said actuator based on the command value u,
wherein said microprocessor is programmed to calculate a feed forward control amount of said actuator based on said target speed ratio i*, and selectively apply said command value u or said feed forward control amount to control said actuator,
wherein said microprocessor is programmed to calculate said control amount v based on a difference between said real speed ratio i and said target speed ratio i*, calculate a corrected control amount v' by correcting said control amount v based on a non-linear relation between said displacement and said real speed ratio, obtain said command value u by processing said corrected control amount v' by a low pass filter provided with a predetermined time constant $\kappa$, and increase said predetermined time constant $\kappa$ for a predetermined time when a change-over is made between application of said feed forward control amount and application of said command value u during control of said actuator.

7. A speed ratio controller as defined in claim 6, wherein said transmission is mounted on a vehicle, said speed ratio controller comprises a sensor for detecting a running state of said vehicle, and said microprocessor is programmed to determine said time constant K according to said running state.

8. A speed ratio controller as defined in claim 7, wherein said sensors comprise a sensor for detecting a vehicle speed VSP, and said microprocessor is programmed to apply said feedforward control amount if said vehicle speed VSP is less than a predetermined vehicle speed V1, and apply said command value u when said vehicle speed is equal to or greater than the predetermined vehicle speed V1, during control of said actuator.

9. A speed ratio controller as defined in claim 8, wherein said microprocessor is programmed to increase said time constant $\kappa$ more when there is a change-over from application of said feedforward control amount to application of said command value u than when there is a change-over from application of said command value u to application of said feedforward control amount during control of said actuator.

10. A speed ratio controller of a continuously variable transmission for a vehicle, said continuously variable transmission continuously changing a speed ratio by displacement of a speed change medium in response to an actuator, said controller comprising:
sensors for detecting a real speed ratio, and
a microprocessor programmed to:
calculate a target speed ratio i* of said transmission,
calculate a control amount v of said actuator so that said real speed ratio i coincides with the target speed ratio i*,
calculate a command value u by correcting said control amount v based on a non-linear relation between said displacement and said real speed ratio, and
control said actuator based on the command value u,
wherein said microprocessor is programmed to calculate a feed forward control amount of said actuator based on said target speed ratio i*, and selectively apply said command value u or said feed forward control amount to control said actuator,
wherein said speed change medium comprises a power roller which varies said real speed ratio i according to a variation of a gyration angle $\phi$ of said power roller, said displacement is represented by said gyration angle $\phi$, said transmission comprises a control valve which varies said gyration angle $\phi$ hydraulically and a mechanical feedback mechanism which mechanically feeds back a variation of said gyration angle $\phi$ to said control valve, and said microprocessor is programmed to calculate a mechanical feedback amount b due to said mechanical feedback mechanism based on said real speed ratio i, calculate said control amount v by applying proportional integral control using a proportional gain $c_1$ and integral gain $c_0$ to a difference between said real speed ratio i and said target speed ratio i*, calculate a corrected control amount v' by adding said mechanical feedback amount b to said control amount v, and calculate said command value u by correcting said corrected control amount v' based on a non-linear relation between said displacement and said real speed ratio.

11. A speed ratio controller as defined in claim 10, wherein said transmission is mounted on a vehicle, said speed ratio controller comprises sensors for detecting a running state of said vehicle, and said microprocessor is programmed to set said proportional gain $c_1$ and integral gain $c_0$ based on said running state.

12. A speed ratio controller as defined in claim 11, wherein said sensors comprise a sensor for detecting a vehicle speed VSP, and said microprocessor is programmed to set said proportional gain $c_1$ to 1 and setting said integral gain to 0 when said vehicle speed VSP is less than a predetermined vehicle speed V1.

13. A speed ratio controller as defined in claim 12, wherein said microprocessor is programmed to apply said proportional gain $c_1$ and integral gain $c_0$ under predetermined time constants $\kappa c_1$ and $\kappa c_0$.

14. A speed ratio controller as defined in claim 13, wherein said microprocessor is programmed to increase said time constants $\kappa c_1$ and $\kappa c_0$ for a predetermined time when there is a change-over between application of said feedforward control amount and application of said command value u during control of said actuator.

15. A speed ratio controller as defined in claim 14, wherein said microprocessor is programmed to determine said time constants $\kappa c_1$ and $\kappa c_0$ based on said running state.

* * * * *